(12) United States Patent  
Inami

(10) Patent No.: US 8,787,978 B2
(45) Date of Patent: Jul. 22, 2014

(54) MOBILE PHONE

(75) Inventor: Akiko Inami, Gifu (JP)

(73) Assignee: KYOCERA Corporation, Kyoto (JP)

( * ) Notice: Subject to any disclaimer, the term of this patent is extended or adjusted under 35 U.S.C. 154(b) by 366 days.

(21) Appl. No.: 12/965,106

(22) Filed: Dec. 10, 2010

(65) Prior Publication Data

US 2011/0143815 A1      Jun. 16, 2011

(30) Foreign Application Priority Data

Dec. 11, 2009   (JP) ................................. 2009-282269

(51) Int. Cl.
*H04M 1/00*      (2006.01)
*H04B 1/38*      (2006.01)

(52) U.S. Cl.
USPC ...................... 455/566; 455/575.1; 455/575.4

(58) Field of Classification Search
USPC .................................... 455/566, 575.1, 575.4
See application file for complete search history.

(56) References Cited

U.S. PATENT DOCUMENTS

| 2007/0285401 A1* | 12/2007 | Ohki et al. ...................... 345/173 |
| 2008/0207273 A1* | 8/2008 | Huo .............................. 455/566 |
| 2009/0051666 A1* | 2/2009 | Choi et al. ...................... 345/173 |
| 2010/0110010 A1* | 5/2010 | Choi ............................. 345/169 |
| 2010/0188350 A1 | 7/2010 | Sawada |
| 2010/0259463 A1* | 10/2010 | Sip et al. ....................... 345/1.3 |

FOREIGN PATENT DOCUMENTS

| JP | 01-282587 A | 11/1989 |
| JP | 2000-322199 A | 11/2000 |
| JP | 2001-069235 A | 3/2001 |
| JP | 2002-366485 A | 12/2002 |
| JP | 2007-189410 A | 7/2007 |
| JP | 2009-071588 A | 4/2009 |
| KR | 20090013129 A | 2/2009 |

OTHER PUBLICATIONS

Office Action dated Dec. 24, 2013, issued in counterpart Japanese Application No. 2013-123186.

* cited by examiner

*Primary Examiner* — Charles Appiah
*Assistant Examiner* — Jaime Holliday
(74) *Attorney, Agent, or Firm* — Procopio, Cory, Hargreaves & Savitch LLP

(57) ABSTRACT

A mobile phone operable to operate a first display using a second touch panel display that partially covers the first display is disclosed. The first display and the second touch panel display are slidably coupled such that the second touch panel display may cover the first display. When low lighting is desired, the second touch panel display may be unlighted, and the first display partially covered by the second touch panel display. A visible portion of the first display may then be operated by touching the unlit second touch panel display.

19 Claims, 39 Drawing Sheets

Figure 7

| Close state | | Full open state | | Partially open state | |
|---|---|---|---|---|---|
| CL-active mode | Upper side display surface: Display on operation: effective Lower side display surface Display off operation: ineffective | FO-active mode | Upper side display surface: Display on operation: effective Lower side display surface Display on operation: effective | PO-first active mode | Upper side display surface: Display off operation: effective Lower side display surface Display on operation: effective |
| CL-sleep mode | Upper side display surface: Display off operation: ineffective Lower side display surface Display off operation: ineffective | | | PO-second active mode | Same as CL-active mode |
| | | | | PO-third active mode | Same as FO-active mode |

# MOBILE PHONE

CROSS-REFERENCE TO RELATED APPLICATION

The present application claims priority under 35 U.S.C. §119 to Japanese Patent Application No. 2009-282269, filed on Dec. 11, 2009, entitled "MOBILE PHONE". The content of which is incorporated by reference herein in its entirety.

FIELD

Embodiments of the present disclosure relate generally to mobile phones, and relate more particularly to mobile phones comprising a plurality of displays.

BACKGROUND

Conventionally, various techniques have been proposed regarding a mobile phone. For example, a mobile phone having two display parts is known, and display devices are known. With a higher performance and a larger-sized screen, a mobile phone has a tendency of increasing its power consumption. In addition, in a dark place such as a movie theater, light emitted from a display surface of a mobile phone is sometimes a hindrance to surroundings. Furthermore, when an incoming call or an electronic mail is received when a user is sleeping and a display of a mobile phone is confirmed, light emitted from a display surface of the mobile phone can be glaring in some cases.

SUMMARY

A mobile phone operable to operate a first display using a second touch panel display that partially covers the first display is disclosed. The first display and the second touch panel display are slidably coupled such that the second touch panel display may cover the first display. On occasions when, for example, low lighting is desired, the second touch panel display may be unlighted, and the first display partially covered by the second touch panel display. A visible portion of the first display may then be operated by touching the unlit second touch panel display.

In a first embodiment, a mobile phone comprises a first casing, a second casing, a display control part, an operation content specifying part, and a positional relation specifying part. The first casing houses a first display part is so that a first display surface thereof is exposed from a surface. The second casing comprises a first surface mutually opposed to a second surface and slidable on the first display surface with the first surface at a side of the first casing, and accommodating a second display part so that a second display surface of the second display part having a touch panel function is exposed from the second surface. The display control part controls the first display surface and the second display surface. The operation content specifying part specifies a content of an operation performed to the second display surface. The positional relation specifying part specifies a positional relation between the first and second casings.

The first casing and the second casing can be set in a first positional relation in which an entire area of the first display surface is covered with the second casing, a second positional relation in which an entire area of the first display surface and the second display surface is visible, and a third positional relation in which a part of the first display surface is exposed from the second casing, by sliding the second casing on the first display surface and as a result of a specification by the positional relation specifying part, when the positional relation between the first casing and the second casing is the third positional relation, the display of the entire area of the second display surface is set in an off state under control of the display control part, and information is displayed on the part of the first display surface, and when it is specified that a prescribed operation is performed to the second display surface by the operation content specifying part, the information displayed on the part of the first display surface is switched under control of the display control part.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 7 is an illustration of an exemplary state table of a mobile device according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phone, and the techniques described herein may also be utilized in other applications. For example, embodiments may be applicable to digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
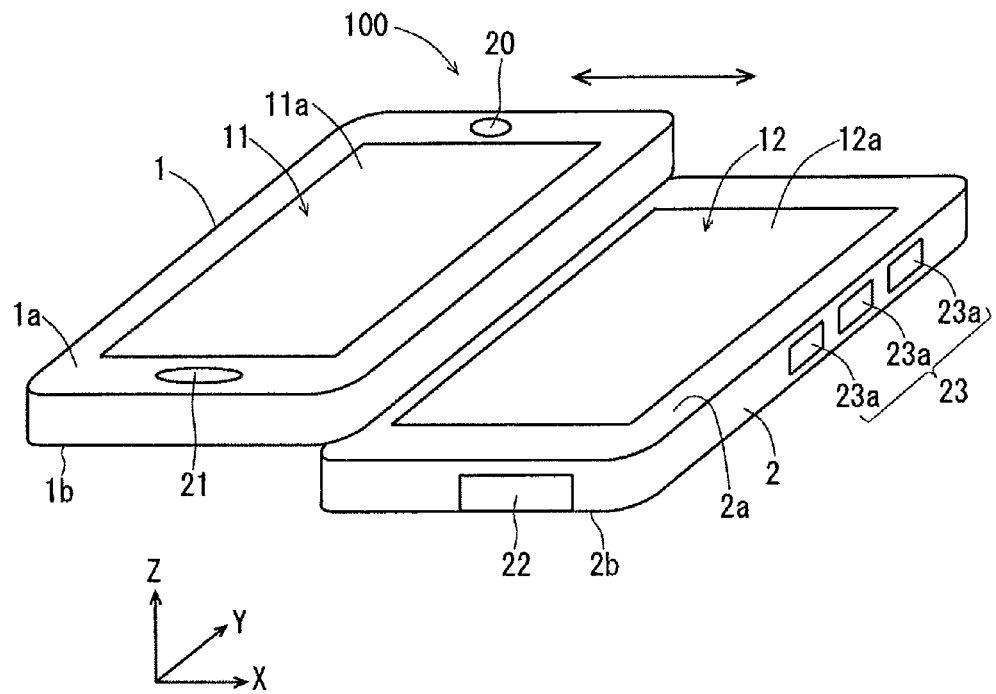
FIG. 1 is an illustration of an exemplary external view of a mobile device according to an embodiment of the disclosure.

FIG. 1 is a perspective view showing an outer appearance of a mobile phone 100 according to an embodiment of the present disclosure. As shown in FIG. 1, the mobile phone 100 comprises an upper side casing 1 and a lower side casing 2 connected to each other by a connection mechanism not shown. The upper side casing 1 has a roughly rectangular plate type shape in a planar view and comprises a first main surface 1a and a second main surface 1b. Similarly, the lower side casing 2 has the roughly rectangular plate type shape in the planar view and comprises the first main surface 2a and the second main surface 2b.

An upper side display part 11 comprising a touch panel function is housed in the upper side casing 1. A lower side display part 12 comprising the touch panel function is housed in the lower side casing 2. A rectangular display surface 11a of the upper side display part 11 is exposed from the first main surface 1a of the upper side casing 1. A rectangular display surface 12a of the lower side display part 12 is exposed from the first main surface 2a of the lower side casing 2. The display surface 11a of the upper side display part 11 is called "upper side display surface 11a", and the display surface 12a of the lower side display part 12 is called "lower side display surface 12a" hereafter. Further, as shown in FIG. 1, a XYZ rectangular coordinate system is used, wherein a short side direction and a long side direction of the upper side casing 1 and the lower side casing 2 are set as the X-axis direction and the Y-axis direction respectively, and a thickness direction of the upper side casing 1 and the lower side casing 2 is set as the Z-axis direction, to thereby explain the mobile phone 100.

A voice output part 20 and a voice input part 21 are further housed in the upper side casing 1. The voice output part 20 comprises a speaker and the voice input part 21 comprises a microphone. The speaker of the voice output part 20 is exposed from an end portion in the +Y direction on the first main surface 1a of the upper side casing 1. The microphone of the voice input part 21 is exposed from an end portion in the −Y direction on the first main surface 1a of the upper side casing 1.

Further, an operation part 23 comprising a plurality of hard keys 23a is provided on a side face of the lower side casing 2 in the +X direction. Then, a power supply connector 22 is provided on a side face of the lower side casing 2 in the −Y direction. By inserting a plug of an AC adapter (not shown) into the power supply connector 22, DC power is supplied to the mobile phone 100 from the AC adapter.

In the mobile phone 100, the upper side casing 1 can slide along the X-axis direction on the lower side display surface 12a of the lower side casing 2, with the second main surface 1b disposed on the side of the lower side casing 2. Thus, first to third positional relations can be established between the upper side casing 1 and the lower side casing 2. The first positional relation is the positional relation between the upper side casing 1 and the lower side casing 2 wherein an entire area of the lower side display surface 12a is covered with the upper side casing 1. The second positional relation is the positional relation between the upper side casing 1 and the lower side casing 2 wherein an entire area of the upper side display surface 11a and the lower side display surface 12a is visible. In addition, the third positional relation is the positional relation between the upper side casing 1 and the lower side casing 2 wherein a part of the lower side display surface 12a is partially exposed from the upper side casing 1. In the mobile phone 100, when the positional relation between the upper side casing 1 and the lower side casing 2 is set in the first positional relation, such a state is called a "close state". Further, when the positional relation between the upper side casing 1 and the lower side casing 2 is set in the second positional relation, such a state is called a "full open state". Also, when the positional relation between the upper side casing 1 and the lower side casing 2 is set in the third positional relation, such a state is called a "partially open state".

Figure 2:
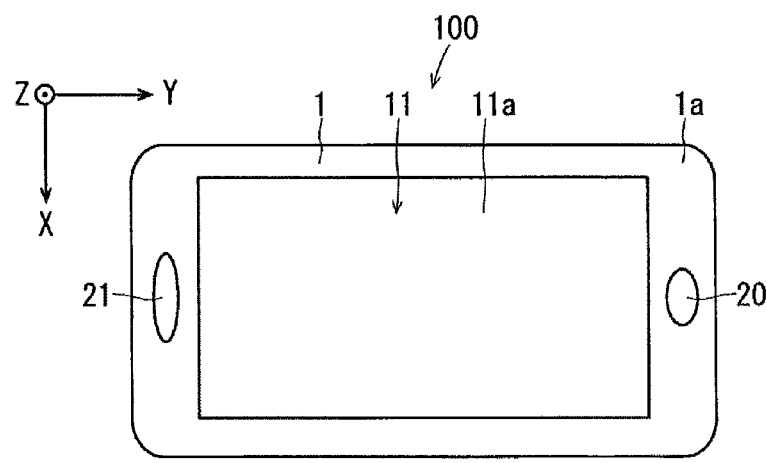
FIG. 2 is an illustration of an exemplary external view of a mobile device according to an embodiment of the disclosure.
Figure 3:
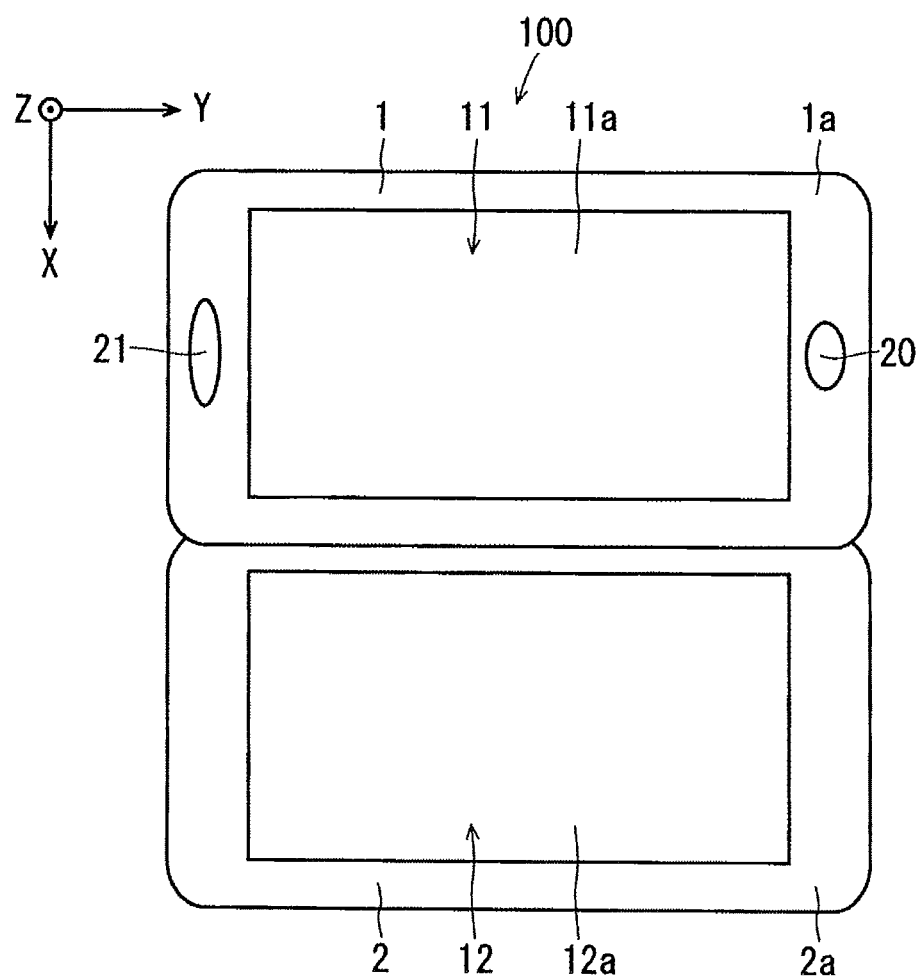
FIG. 3 is an illustration of an exemplary external view of a mobile device according to an embodiment of the disclosure.
Figure 4:
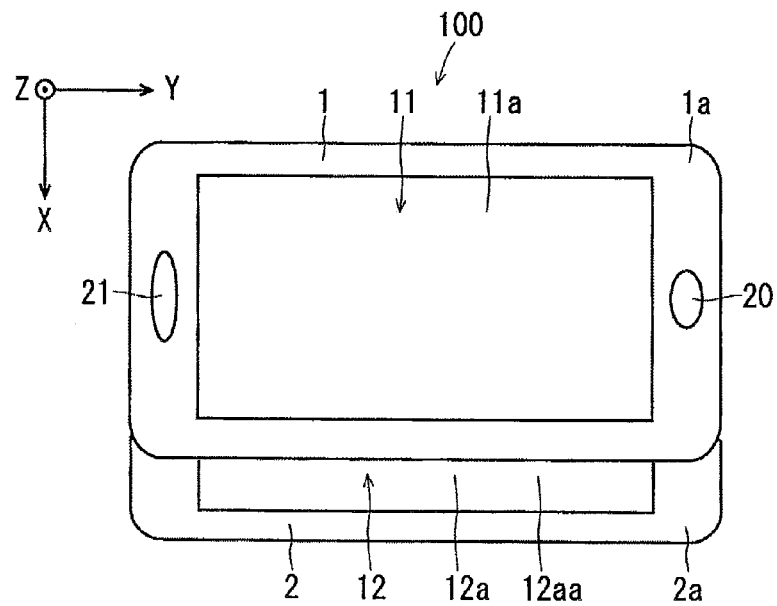
FIG. 4 is an illustration of an exemplary external view of a mobile device according to an embodiment of the disclosure.

FIG. 2-FIG. 4 are views showing the close state, the full open state, and the partially open state of the mobile phone 100. As shown in FIG. 2, in the close state, the upper side casing 1 and the lower side casing 2 are overlapped on each other, and therefore the upper side display surface 11a is visible. Further, as shown in FIG. 3, in the full open state, the upper side casing 1 slides fully, and therefore an entire area of the upper side display surface 11a and an entire area of the lower side display surface 12a are visible. Also, as shown in FIG. 4, in the partially open state, the upper side casing 1 slides partially, and therefore the upper side casing 1 and the lower side casing 2 are partially overlapped on each other. In the partially open state, the entire area of the upper side display surface 11a is visible, and the lower side display surface 12a is partially visible. In an example of FIG. 4, an area of about ⅓ from an edge of the lower side display surface 12a in the +X direction is visible. A part exposed from the upper side casing 1 on the lower side display surface 12a is called an "exposed part 12aa" hereafter.

If a user has the lower side casing 2 in his/her hand, which is the lower side casing of the mobile phone 100 in the close state, and his/her finger is applied to the upper side casing 1, to thereby make the upper side casing 1 slide in the −X direction with a relatively strong force, the mobile phone 100 is set in the full open state. If the upper side casing 1 is made to slide in the −X direction with a relatively weak force, the mobile phone 100 is set in the partially open state. Also, if the user has the lower side casing 2 in his/her hand, which is the lower side casing of the mobile phone 100 in the full open state, and his/her finger is applied to the upper side casing 1, to thereby make the upper side casing 1 slide in the +X direction with a relatively strong force, the mobile phone 100 is set in the close state. If the upper side casing 1 is made to slide in the +X direction with a relatively weak force, the mobile phone 100 is set in the partially open state. Further, if the user has the lower side casing 2 in the hand, which is the lower side casing of the mobile phone 100 in the partially open state, and his/her finger is applied to the upper side casing 1, to thereby make the upper side casing 1 slide in the +X direction, the mobile phone 100 is set in the close state. If the upper side casing 1 is made to slide in the −X direction, the mobile phone 100 is set in the full open state.

<Electric Structure of the Mobile Phone>

Figure 5:
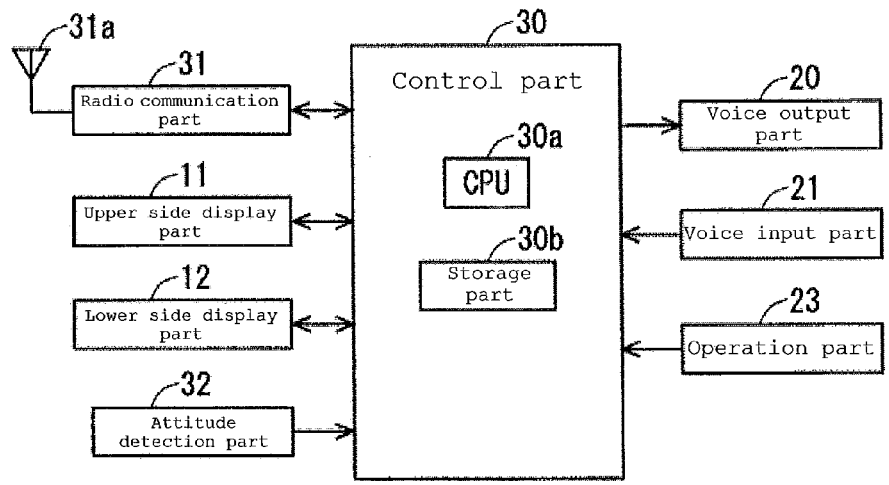
FIG. 5 is an illustration of an exemplary functional block diagram of a mobile device according to an embodiment of the disclosure.

FIG. 5 is a block diagram showing an electric structure of the mobile phone 100 according to an embodiment of the present disclosure. As shown in FIG. 5, the mobile phone 100 comprises a control part 30; a radio communication part 31; an antenna 31a; an attitude detection part 32; the upper side display part 11; the lower side display part 12; the voice output part 20; the voice input part 21; and the operation part 23. The control part 30, the radio communication part 31, and the attitude detection part 32 are housed, for example, in the lower side casing 2.

The control part 30 comprises CPU 30a and a storage part 30b, etc., and manages collectively an operation of the mobile phone 100 by controlling other constituent element of the mobile phone 100. The storage part 30b may comprise, for example but without limitation, a random access storage device such as a random access memory (RAM), a non-volatile storage device (non-volatile semiconductor memory, hard disk device, optical disk device, and the like), HDD, or any other form of storage medium known in the art. Various function of the control part 30 is realized by executing various programs in the storage part 30b by the CPU 30a.

By using the antenna 31a, the radio communication part 31 receives a radio signal from a mobile phone different from the mobile phone 100 or a communication device, such as but without limitation, a Web server connected to the internet, and the like, and applies amplification processing or down-conversion processing to a reception signal, and outputs the reception signal to the control part 30. Further, the radio communication part 31 applies up-conversion processing or amplification processing to a transmission signal generated by the control part 30, and radio-transmits the transmission signal to a mobile phone different from the mobile phone 100 or a communication device connected to the Internet, via the antenna 31a.

The attitude detection part 32 may comprise an acceleration sensor, etc. which detects an attitude of the mobile phone 100. For example, the attitude detection part 32 detects whether the long side direction of the upper side casing 1 and the lower side casing 2 is a vertical direction (direction of a gravitational force), or is a direction perpendicular to the vertical direction.

The voice output part 20 converts voice data from the control part 30 to voice and outputs it to outside. The voice input part 21 converts voice from outside into voice data and outputs it to the control part 30.

The upper side display part 11 displays various kinds of information such as character, symbol, and graphics, on the upper side display surface 11a, under control of the control part 30. Further, the upper side display part 11 comprising the touch panel function detects the operation of a finger of the user applied to the upper side display surface 11a and outputs same to the control part 30.

The lower side display part 12 displays various kinds of information such as character, symbol, and graphics, on the lower side display surface 12a, under control of the control part 30 similar as the upper side display part 11. Further, the lower side display part 12 comprising the touch panel function detects the operation of the finger of the user applied to the lower side display surface 12a and outputs it to the control part 30.

The upper side display part 11 and the lower side display part 12 comprises, for example, a transmission type liquid crystal display panel and a backlight light source for irradiating the liquid crystal display panel with light from backside. The upper side display part 11 and the lower side display part 12 may be a non-self-luminous display other than the liquid crystal display panel, and also may be a self-luminous display panel such as an organic EL panel.

As described above, the operation part 23 comprises a plurality of hard keys (activation type switch) 23a, and detects an activating operation of the user applied to each hard key 23a and outputs same to the control part 30.

In an embodiment, the user performs operation to the upper side display surface 11a, the lower side display surface 12a, and the operation part 23, to input various information into the mobile phone 100.

Figure 6:
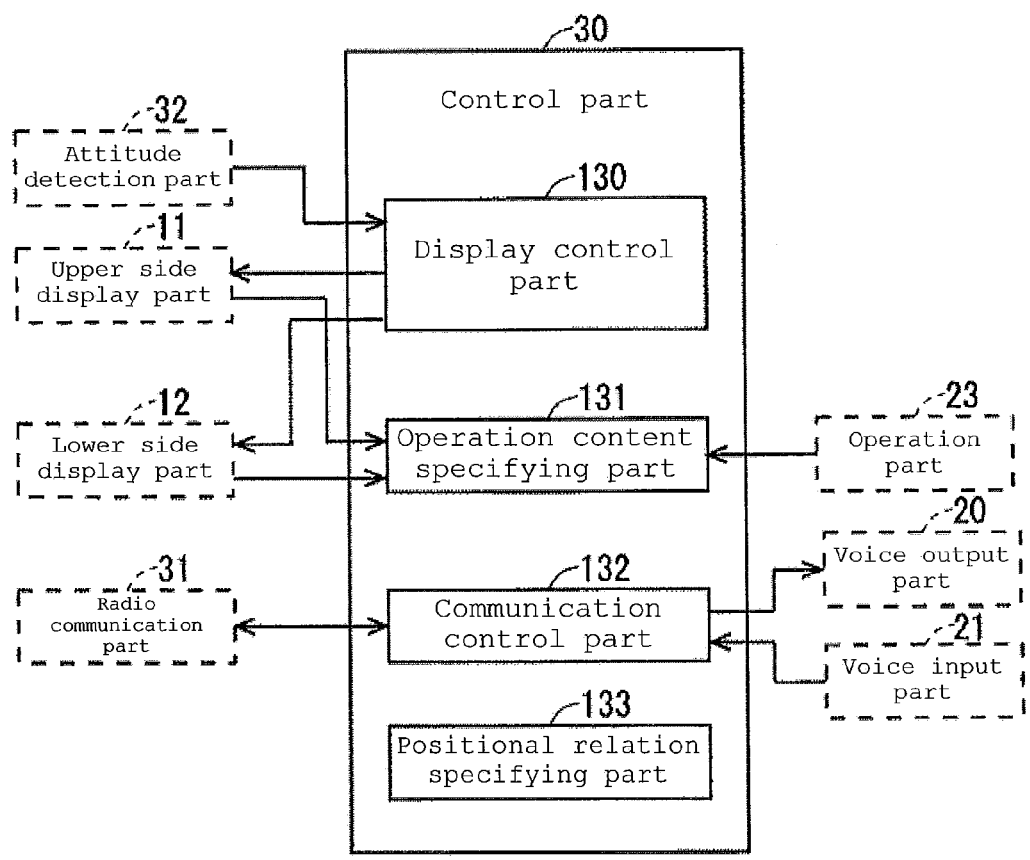
FIG. 6 is an illustration of an exemplary functional block diagram of a mobile device according to an embodiment of the disclosure.

FIG. 6 is a view showing a plurality of function blocks formed in the control part 30, by executing various kinds of program in the storage part 30b, by the CPU 30a of the control part 30. As shown in FIG. 6, a display control part 130, an operation content specifying part 131, a communication control part 132, and a positional relation specifying part 133 are formed in the control part 30, as a function block.

The display control part 130 controls displays of the upper side display part 11 and the lower side display part 12. The display control part 130 can display information such as character on the upper side display surface 11a and the lower side display surface 12a, or can individually set the display of an entire area of the upper side display surface 11a and the lower side display surface 12a in an off state, respectively.

In this document, the off state of the entire area of the display surface means that the information that is visible from outside cannot be displayed. In contrast, the on state of the display of the entire area of the display surface means that the information that is visible from outside in the entire area can be displayed. Accordingly, for example, when the display control part 130 sets the display of the entire area of the upper side display surface 11a in the on state, the display control part 130 can display the information that is visible from outside over the entire area. For example, when the display control part 130 sets the display of the entire area of the upper side display surface 11a in the off state, the display control part 130 can not display the information that is visible from outside over the entire area.

In an embodiment, the upper side display part 11 comprises the liquid crystal display panel and the backlight light source. Therefore, the display control part 130 causes a light emission from the backlight light source when the display of the entire area of the upper side display surface 11a is set in the on state, and does not cause the light emission from the backlight light source when the display of the entire area of the upper side display surface 11a is set in the off state. Similarly, the lower side display part 12 comprises the liquid crystal display panel and the backlight light source. Therefore, the display control part 130 causes the light emission from the backlight light source when the display of the entire area of the lower side display surface 12a is set in the on state, and does not cause the light emission from the backlight light source when the display of the entire area of the lower side display surface 12a is set in the off state. Note that when the upper side display part 11 and the lower side display part 12 have the self-luminous display panel, electric power supplied to this panel is stopped, and the display of the entire area of the upper side display surface 11a and the lower side display surface 12a is set in the off state.

Further, the display control part 130 displays characters, etc., in a proper direction in accordance with the attitude of the mobile phone 100, on the upper side display surface 11a and the lower side display surface 12a, by changing the direction of the characters, etc, displayed on the upper side display surface 11a and the lower side display surface 12a based on a detection result of the attitude detection part 32.

The operation content specifying part 131 specifies a content of the operation detected by the upper side display part 11 and the lower side display part 12. For example, the operation performed to the upper side display surface 11a is specified to be the operation of inputting a specified character, or to be the operation of performing a specified setting. In addition, the operation content specifying part 131 specifies the content of the operation performed to a plurality of hard keys 23a, detected by the operation part 23. Further, the operation content specifying part 131 can ignore the operation detected by the upper side display part 11 and the lower side display part 12. Thus, the operation of the user performed to the upper side display surface 11a and the lower side display surface 12a is deemed ineffective, and an original behavior of the mobile phone 100 is not performed corresponding to the operation of the user.

The communication control part 132 performs various communications with a communication partner by controlling the radio communication part 31. For example, the communication control part 132 performs voice communication or electronic mail communication, with another mobile phone. Further, the communication control part 132 performs data communication with a Web server. When the voice communication is performed, the communication control part 132 generates a transmitted signal comprising voice data inputted from the voice input part 21, and transmits this transmitted signal to other mobile phone via the radio communication part 31. Further, the communication control part 132 acquires the voice data from a signal received by the radio communication part 31, and outputs this voice data to the voice output part 20.

The positional relation specifying part 133 specifies the positional relation between the upper side casing 1 and the lower side casing 2. Specifically, the positional relation specifying part 133 specifies in which of the first to third positional relations, the upper side casing 1 and the lower side casing 2 are positioned. Thus, the positional relation specifying part 133 specifies which of the close state, the full open state, and the partially open state, the mobile phone 100 is established.

Next, an operation mode of the mobile phone 100 in the close state, the full open state, and the partially open state, will be described.

<Close State>

The operation mode of the mobile phone 100 in the close state shown in FIG. 2 comprises an active mode and a sleep mode. The active mode and the sleep mode of the mobile phone 100 in the close state are called "CL-active mode" and "CL-sleep mode" respectively. In the CL-active mode, the display of the upper side display surface 11a is set in the on state, and the display of the lower side display surface 12a is set in the off state. Further, in the CL-active mode, the operation performed to the upper side display surface 11a is effective, and the operation performed to the lower side display surface 12a is ineffective.

Thus, in the CL-active mode, the display of the upper side display surface 11a is set in the on state, and the operation performed to the upper side display surface 11a is effective. Therefore, the user can utilize the upper side display part 11 out of the upper side display part 11 and the lower side display part 12, to perform communication such as making a call and/or sending an electronic mail and activate various kinds of settings of the mobile phone 100.

In the CL-sleep mode, displays of both the upper side display surface 11a and the lower side display surface 12a are set in the off states, and operations performed to the upper side display surface 11a and the lower side display surface 12a are ineffective.

In the close state, the lower side display surface 12a is not visible. Therefore, actually, the operation is not performed to the lower side display surface 12a. However, ineffective operation performed to the lower side display surface 12a means that even if the operation is performed to the lower side display surface 12a, the operation content specifying part 131 ignores this operation.

In the close state, the operation mode is shifted to a CL-sleep mode when there are no operations performed to the upper side display surface 11a and the operation part 23 for a given period of time in the CL-active mode. Then, when the operation to the operation part 23 is performed in the CL-sleep mode, the operation mode is shifted to the CL-active mode.

<Full Open State>

The operation mode of the mobile phone 100 in the full open state shown in FIG. 3 comprises the active mode and does not comprise the sleep mode. The active mode of the mobile phone in the full open state is called "FO-active mode". In the FO-active mode, the displays of both the upper side display surface 11a and the lower side display surface 12a are set in the on states, and the operations performed to both the upper side display surface 11a and the lower side display surface 12a are effective.

Thus, in the FO-active mode, since the displays of both the upper side display surface 11a and the lower side display surface 12a are set in the on states and the operations performed to both the upper side display surface 11a and the lower side display surface 12a are effective, the user can perform various communications such as making a call and/or sending an electronic mail and activate various kind of setting of the mobile phone 100, by utilizing both the upper side display part 11 and the lower side display part 12.

<Partially Open State>

The operation mode of the mobile phone 100 in the partially open state shown in FIG. 4 comprises a first, a second and a third active mode. The first, the second, and the third modes of the mobile phone 100 in the partially open state are called "PO-first active mode", "PO-second active mode", and "PO-third active mode" respectively.

In the PO-first active mode, the display of the upper side display surface 11a is set in the off state, and the display of the lower side display surface 12a is set in the on state. Also, in the PO-first active mode, the operation performed to the upper side display surface 11a is effective, and the operation performed to the lower side display surface 12a is ineffective.

Setting for the upper side display surface 11a and the lower side display surface 12a in the mobile phone 100 in the PO-second active mode, is the same as the setting in the aforementioned CL-active mode. Also, the setting for the upper side display surface 11a and the lower side display surface 12a in the mobile phone 100 in the PO-third active mode is the same as the setting in the aforementioned FO-active mode.

The setting for the upper side display surface 11a and the lower side display surface 12a in the mobile phone 100 in each operation mode as described above is shown in FIG. 7.

The CL-sleep mode, the operation to the upper side display surface 11a may be set effective. In this case, when the operation to the operation part 23 is performed in the CL-sleep mode, the operation mode is shifted to the CL-active mode, and also when the operation to the upper side display surface 11a is performed, the operation mode is shifted to the CL-active mode.

Further, in the partially open state, a part excluding an exposed part 12aa of the lower side display surface 12a is not visible. Therefore, the display of this part is not necessarily set in the on state. Accordingly, when the display in the exposed part 12aa can be set in the on state on the lower side display surface 12a, by providing a plurality of backlight light sources for the lower side display part 12, the display of the exposed part 12aa may be set in the on state in the PO-first active mode. Namely, regarding the exposed part 12aa on the lower side display surface 12a, information that is visible from outside may be displayed, and regarding the other part, information that is visible from outside may not be displayed.

Figure 8:
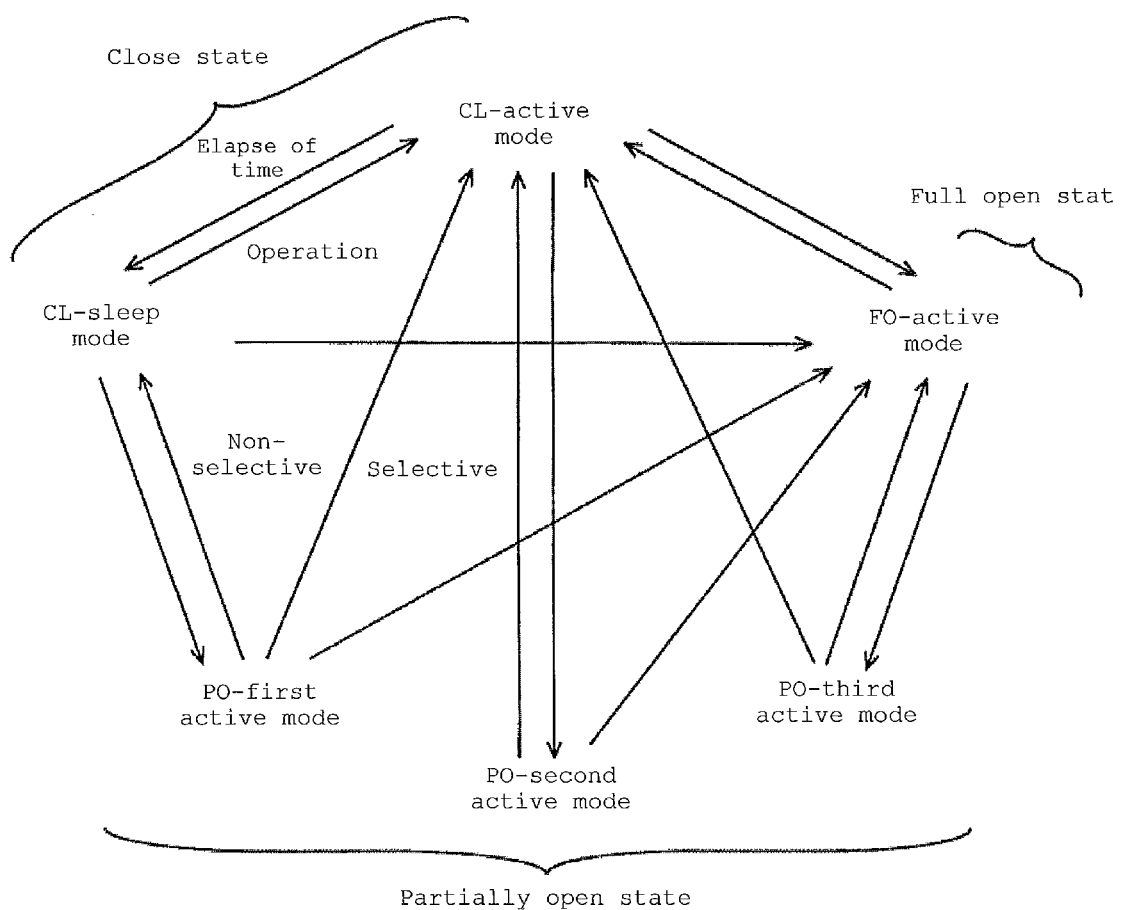
FIG. 8 is an illustration of an exemplary state diagram of a mobile device according to an embodiment of the disclosure.

Next, when the positional relation between the upper side casing 1 and the lower side casing 2 is changed, namely, when a sliding state of the upper side casing 1 is changed, explanation will be given for a case that how the operation mode of the mobile phone 100 is changed. FIG. 8 is a view showing a state shift of the operation mode of the mobile phone 100.

<Close State to Full Open State>

In the full open state, only the FO-active mode exists as the operation mode of the mobile phone 100. Accordingly, when the mobile phone 100 is changed from the close state to the full open state, the operation mode of the mobile phone 100 is set in the FO-active mode, even in a case that the operation mode of the mobile phone 100 is set in either case of the CL-active mode and the CL-sleep mode.

<Close State to Partially Open State>

When the operation mode of the mobile phone 100 in the close state is set in the CL-active mode, and the mobile phone 100 is changed to the partially open state, the operation mode of the mobile phone 100 is set in the PO-second active mode. Namely, in this case, the setting for the upper side display surface 11a and the lower side display surface 12a in the mobile phone 100 is not changed, and only the sliding state of the upper side casing 1 is changed. Therefore, the operation inside of the mobile phone 100 is not changed.

When the operation mode of the mobile phone 100 in the close state is set in the CL-sleep mode, and the mobile phone 100 is changed to the partially open state, the operation mode of the mobile phone 100 is set in the PO-first active mode. As a result, the display of the upper side display surface 11a is remained to be set in the off state and is not changed, and the display of the entire area of the lower side display surface 12a is changed from off to on, thus making it possible to display the information in the exposed part 12aa of the lower side display surface 12a. Further, the operation to the upper side display surface 11a is changed from ineffective operation to effective operation. Note that the information displayed on the exposed part 12*aa* is described in detail below.

<Full Open State to Close State>

When the mobile phone 100 is changed from the full open state to the close state, the operation mode is changed from the FO-active mode to the CL-active mode.

<Full Open State to Partially Close State>

When the mobile phone 100 is changed from the full open state to the partially close state, the operation mode is changed from the FO-active mode to the PO-third active mode. Namely, in this case, the setting for the upper side display surface 11*a* and the lower side display surface 12*a* in the mobile phone 100 is not changed, and only the sliding state of the upper side casing 1 is changed. Therefore, the operation inside of the mobile phone 100 is not changed.

<Partially Open State to Close State>

When the operation mode of the mobile phone 100 in the partially open state is set in the PO-first active mode and this mobile phone 100 is changed to the close state, the operation mode of this mobile phone 100 is changed to the CL-active mode or the CL-sleep mode.

As described above, when the operation mode of the mobile phone 100 is set in the PO-first active mode, the information is displayed on the exposed part 12*aa* of the lower side display surface 12*a*. Although details are described below, in the mobile phone 100, a received call history of a speech (called "received call history" hereafter) and a reception history of the electronic mail (simply called "received mail history" hereafter) can be displayed on the exposed part 12*aa*. In the PO-first active mode, the received call history or the received mail history displayed on the exposed part 12*aa* is selected, and when the mobile phone 100 is changed to the close state in this state, the operation mode of the mobile phone 100 is changed to the CL-active mode.

In the PO-first active mode, when the mobile phone 100 is changed to the close state wherein the received call history or the received mail history displayed on the exposed part 12*aa* is not selected, the operation mode of the mobile phone 100 is changed to the CL-sleep mode.

When the operation mode of the mobile phone 100 in the partially open state is set in the PO-second active mode and this mobile phone 100 is changed to the close state, the operation mode of this mobile phone 100 is set in the CL-active mode. Namely, in this case, the setting for the upper side display surface 11*a* and the setting for the lower side display surface 12*a* in the mobile phone 100 are not changed, and only the sliding state of the upper side casing 1 is changed. Therefore, the operation inside of the mobile phone 100 is not changed.

When the operation mode of the mobile phone 100 in the partially open state is set in the PO-third active mode and the mobile phone 100 is changed to the close state, the operation mode of the mobile phone 100 is changed to the CL-active mode.

<Partially Open State to Full Open State>

The operation mode of the mobile phone 100 in the full open state is set in the FO-active mode. Accordingly, when the mobile phone 100 is changed from the partially open state to the full open state, the operation mode of the mobile phone 100 is set in the FO-active mode, even in a case that the operation mode of the mobile phone 100 is set in any one of the PO-first active mode, PO-second active mode, and PO-third active mode.

The setting for the upper side display surface 11*a* and the setting for the lower side display surface 12*a* in the mobile phone 100 in the PO-third active mode, are the same as the setting of the mobile phone 100 in the FO-active mode. Accordingly, even if the operation mode of the mobile phone 100 is changed from the PO-third active mode to the FO-active mode, the setting for the upper side display surface 11*a* and the setting for the lower side display surface 12*a* in the mobile phone 100 are not changed. Namely, only the sliding state of the upper side casing 1 is changed, and the operation inside of the mobile phone 100 is not changed.

<Behavior of the Mobile Phone in the PO-First Active Mode>

The behavior of the mobile phone 100 with operation mode set in the PO-first active mode is described below. In the PO-first active mode, the received call history and the received mail history can be displayed on the exposed part 12*aa* of the lower side display surface 12*a*. In the PO-first active mode, any one of the displays of the display of the received call history, the display of the received mail history, and displays of both the received call history and the received mail history can be shown based on user's setting. Further, in the PO-first active mode, the received call history and the received mail history displayed on the exposed part 12*aa* can be limited based on the user's setting. For example, the received call history from a communication partner who belongs to a certain specific group and registered in a later described address book file can be displayed on the exposed part 12*aa*. The user's setting regarding the display of the exposed part 12*aa* is described in detail below.

The communication control part 132 detects incoming calls by the radio communication part 31. Then, the communication control part 132 generates and stores the received call history in the storage part 30*b* based on the detected incoming calls. Several dozen newest incoming calls are stored in the storage part 30*b*.

Further, the communication control part 132 generates the received mail history based on the electronic mail received by the radio communication part 31. Then, the communication control part 132 stores the generated received mail history in the storage part 30*b*. Several dozen newest mails are stored in the storage part 30*b*.

<Display of the Received Call History>

Figure 9:
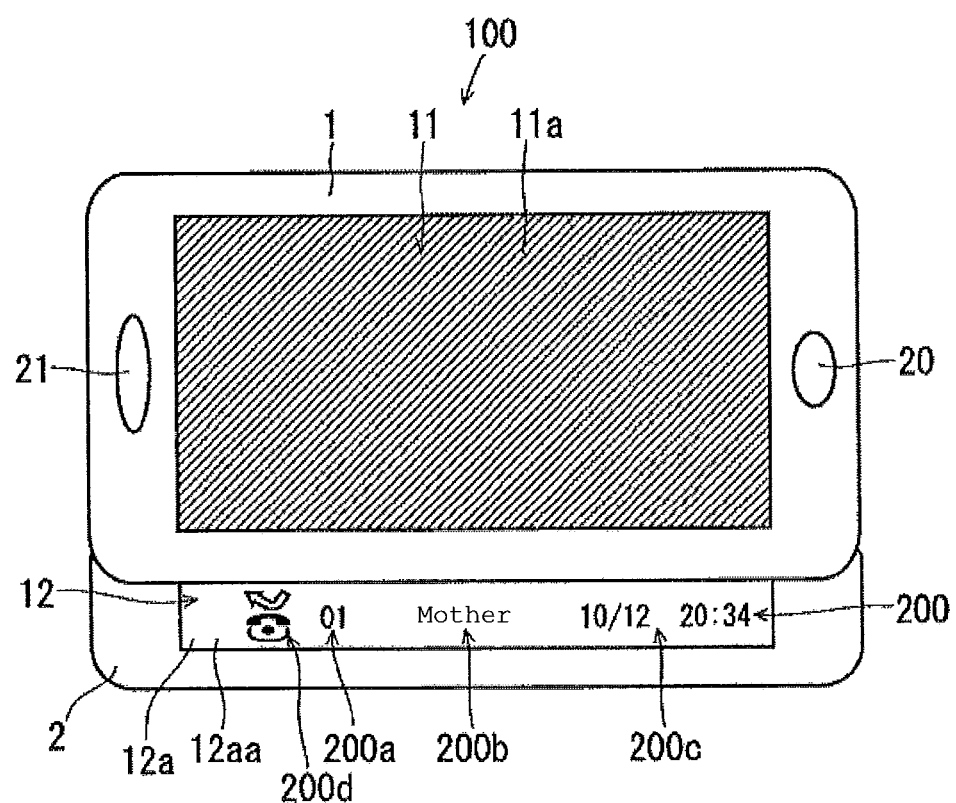
FIG. 9 is an illustration of an exemplary external view of a mobile device according to an embodiment of the disclosure.

The behavior of the mobile phone 100 when the received call history is displayed on the exposed part 12*aa* is explained as follows. FIG. 9 is a view showing a state that the received call history is displayed on the exposed part 12*aa* of the lower side display surface 12*a* in the mobile phone 100. In FIG. 9 and in the subsequent figures, the upper side display surface 11*a* is shown by diagonal lines, to show the off state of the display in the entire area of the upper side display surface 11*a* in the mobile phone 100 set in the PO-first active mode.

As shown in FIG. 9, for example, one received call history 200 is displayed on the exposed part 12*aa*. The received call history 200 comprises serial number 200*a* given to a plurality of received call histories 200, being display objects in the storage part 30*b* in an order from a newest one, communication partner information 200*b* for specifying a partner of an incoming call, time of incoming call (including date) 200*c*, and status icon 200*d* for showing whether the mobile phone 100 responds to the incoming call. The status icon 200*d* shown in FIG. 9 shows that there is no response to the incoming call, namely, the incoming call is a call during absence.

Figure 10:
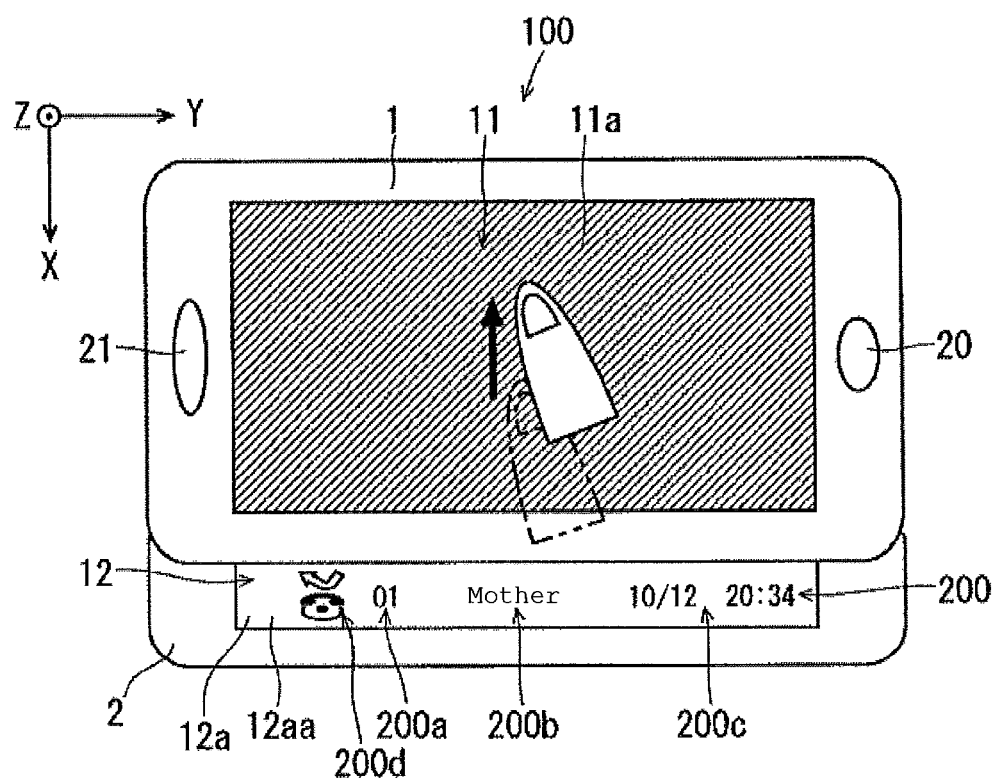
FIG. 10 is an illustration of an exemplary external view of a mobile device according to an embodiment of the disclosure.
Figure 11:
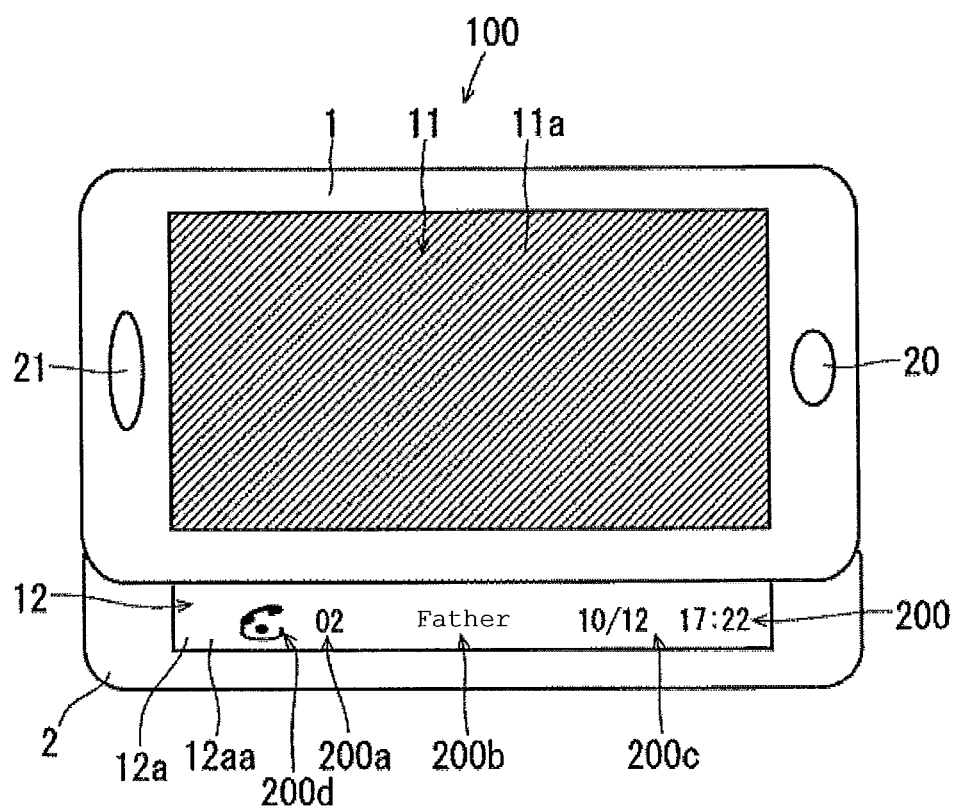
FIG. 11 is an illustration of an exemplary external view of a mobile device according to an embodiment of the disclosure.
Figure 12:
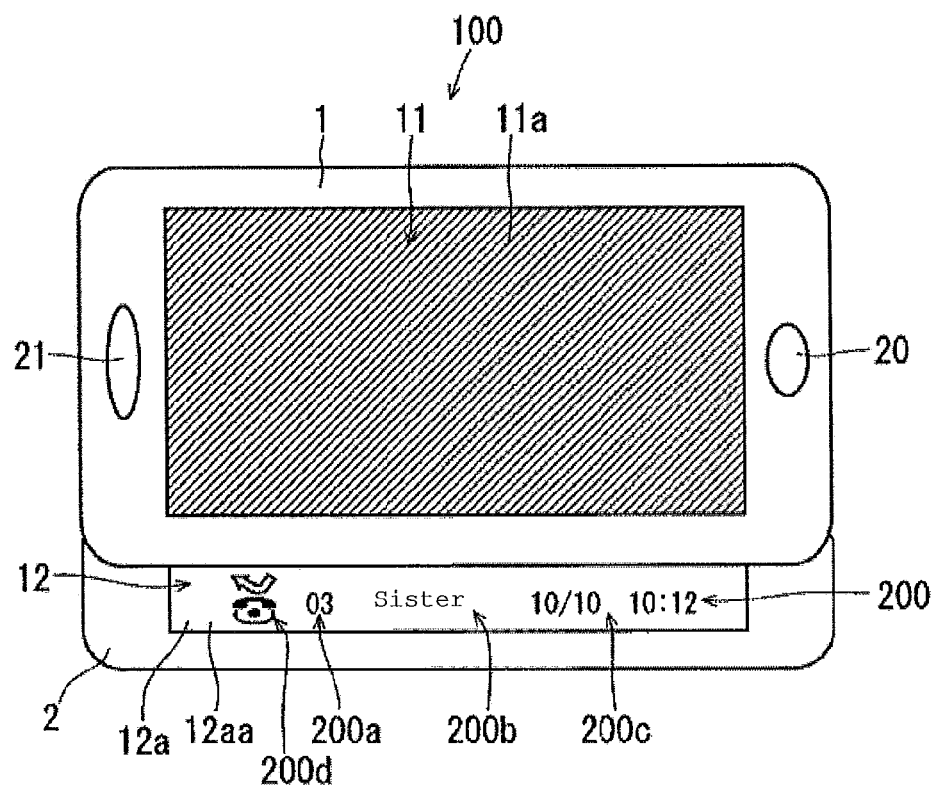
FIG. 12 is an illustration of an exemplary external view of a mobile device according to an embodiment of the disclosure.

Further when it is specified by the operation content specifying part 131 that a prescribed operation is performed to the upper side display surface 11*a*, the information displayed on the exposed part 12*aa* is switched. According to an embodiment, when it is specified by the operation content specifying part 131 that a prescribed operation is performed to the upper side display surface 11*a*, the display of the exposed part 12*aa* of the lower side display surface 12*a* is scrolled, and other one received call history 200 is displayed on the exposed part 12aa. According to the embodiment shown in FIG. 10, if the user applies her/his finger to the upper side display surface 11a, and the finger is moved to the upper side (−X direction), with the mobile phone 100 held in an attitude for use (in a lateral attitude in the example of FIG. 10), the operation content specifying part 131 specifies its operation content and the display of the exposed part 12aa is scrolled to the upper side. The display of the exposed part 12aa is scrolled to the upper side in accordance with an amount of movement of the finger of the user to the upper side. FIG. 11 shows a state that a first next received call history 200 is displayed on the exposed part 12aa by scrolling the display of the exposed part 12aa to the upper side. Further, FIG. 12 shows a state that a second received call history 200 is displayed on the exposed part 12aa by further scrolling the display of the exposed part 12aa to the upper side. As shown in FIG. 10 to FIG. 12, the user can display on the exposed part 12aa the received call history 200 which is older than the received call history 200 displayed at present, by moving his/her finger to the upper side, while touching on the upper side display surface 11a by his/her finger, in an order from a newest time of reception 200c.

Figure 13:
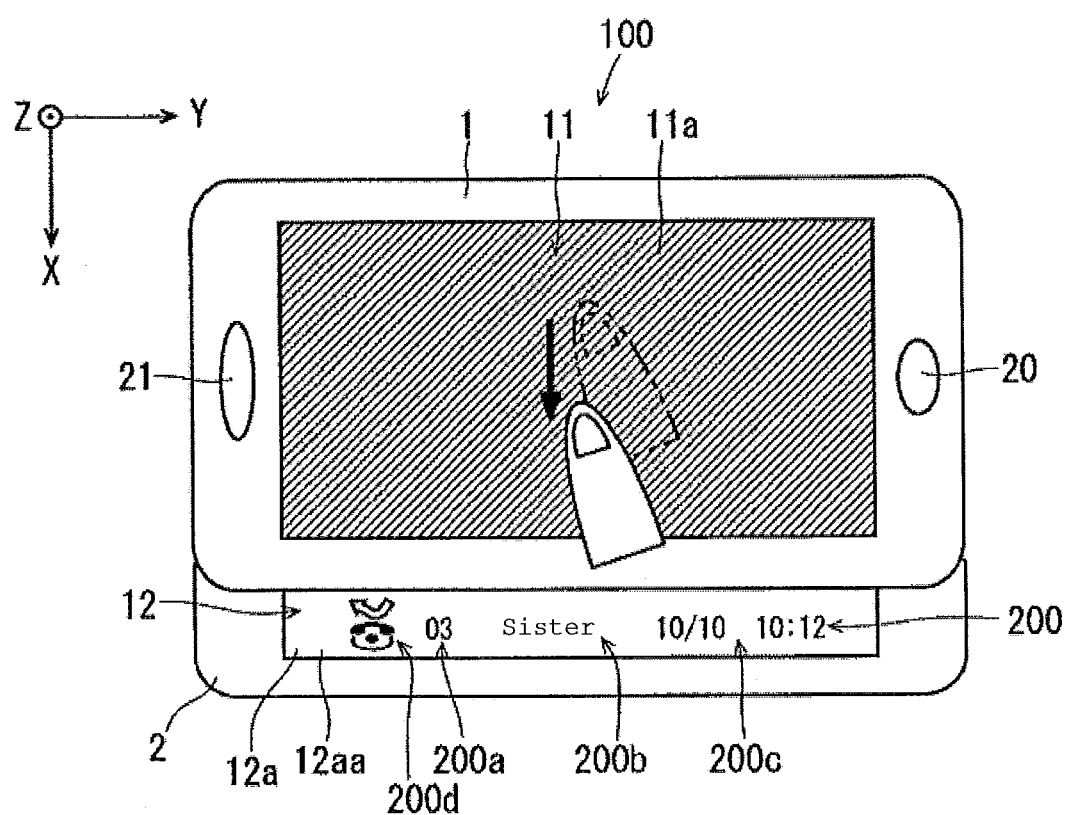
FIG. 13 is an illustration of an exemplary external view of a mobile device according to an embodiment of the disclosure.

As shown in FIG. 13, if the user moves his/her finger to the lower side (+X direction) while touching on the upper side display surface 11a by his/her finger, the operation content specifying part 131 specifies the operation content and the display of the exposed part 12aa of the lower side display surface 12a is scrolled to the lower side. The display of the exposed part 12aa is scrolled to the lower side based on the amount of movement of the finger of the user to the lower side. Thus, the user can display in the exposed part 12aa the received call history 200 newer than the received call history 200 displayed at present, by moving his/her finger to the lower side, while touching on the upper side display surface 11a by his/her finger, in an order from an oldest time of reception 200c.

<Display of the Received Mail History>

Figure 14:
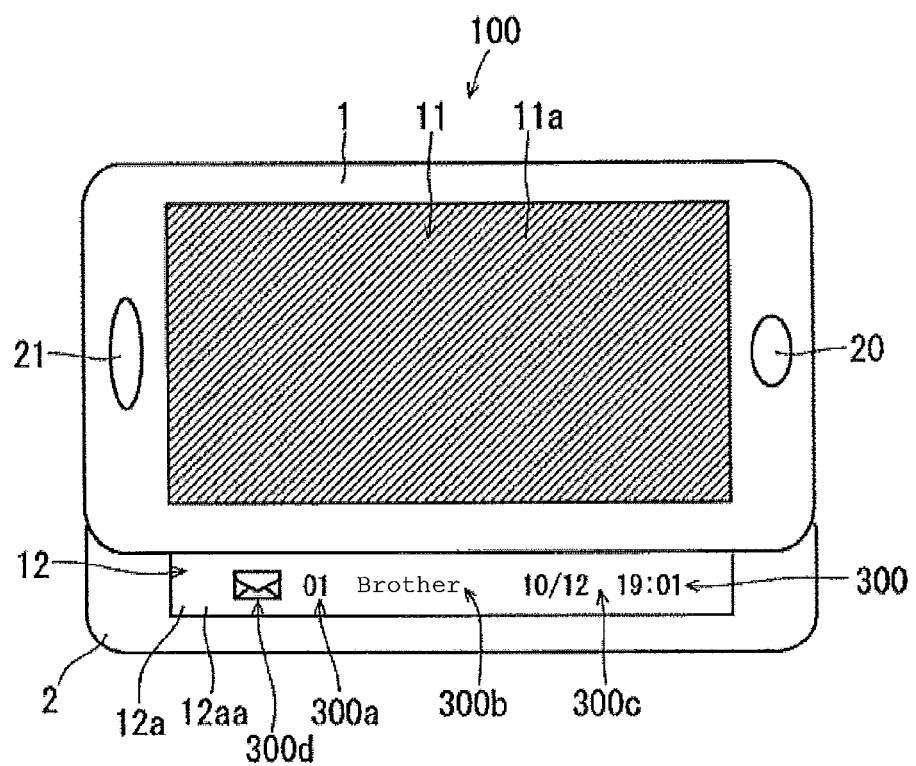
FIG. 14 is an illustration of an exemplary external view of a mobile device according to an embodiment of the disclosure.

The behavior of the mobile phone 100 when the received mail history is displayed on the exposed part 12aa is explained as follows. FIG. 14 is a view showing a state that the received mail history is displayed on the exposed part 12aa in the mobile phone 100. As shown in FIG. 14, for example one received mail history 300 is displayed on the exposed part 12aa. The received mail history 300 comprises serial number 300a given to a plurality of received mail histories 300, being display objects, in the storage part 30b, in an order from a newest one, communication partner information 300b for specifying a reception partner, time of reception (including date) 300c, and status icon 300d showing whether the electronic mail is opened. The status icon 300d shown in FIG. 14 shows that the electronic mail is not opened. The electronic mail is opened means that a text of the electronic mail is displayed even once in the mobile phone 100.

Further, even when the received mail history 300 is displayed on the exposed part 12aa, if the user moves her/his finger to the upper side while touching on the upper side display surface 11a by her/his finger, with the mobile phone 100 held in the attitude for use, the operation content specifying part 131 specifies the operation content and the display of the exposed part 12aa of the lower side display surface 12a is scrolled to the upper side. Thus, the next received mail 300 is displayed on the exposed part 12aa. The display of the exposed part 12aa is scrolled to the upper side in accordance with the amount of movement of the finger of the user.

Figure 15:
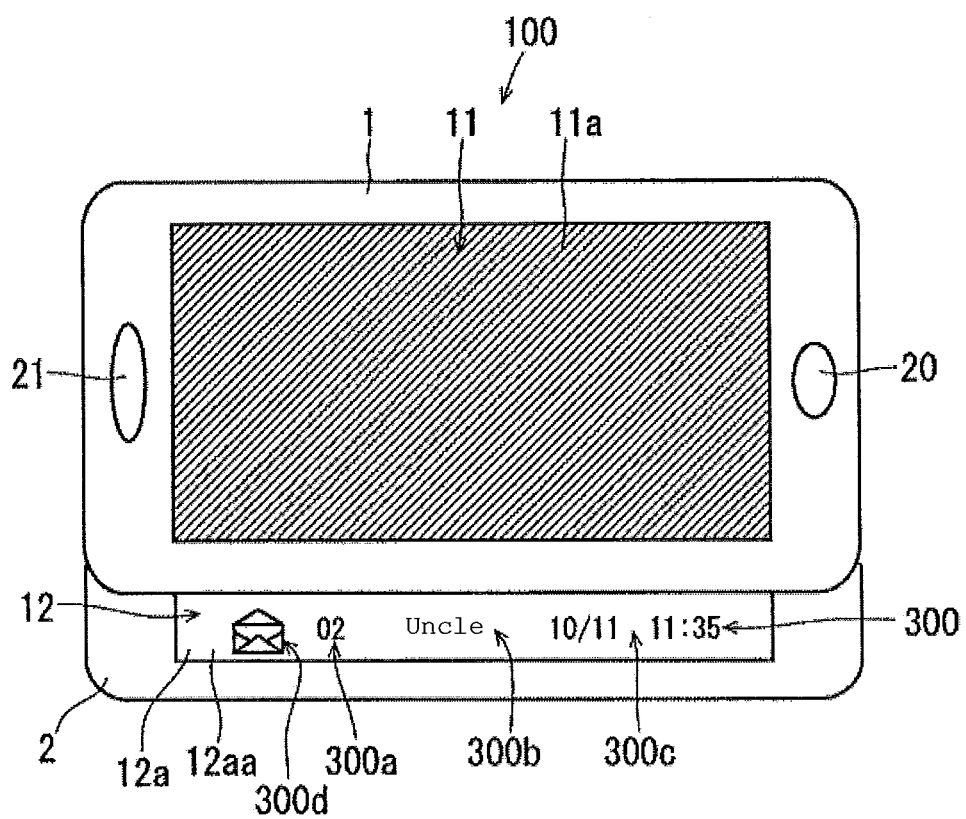
FIG. 15 is an illustration of an exemplary external view of a mobile device according to an embodiment of the disclosure.
Figure 16:
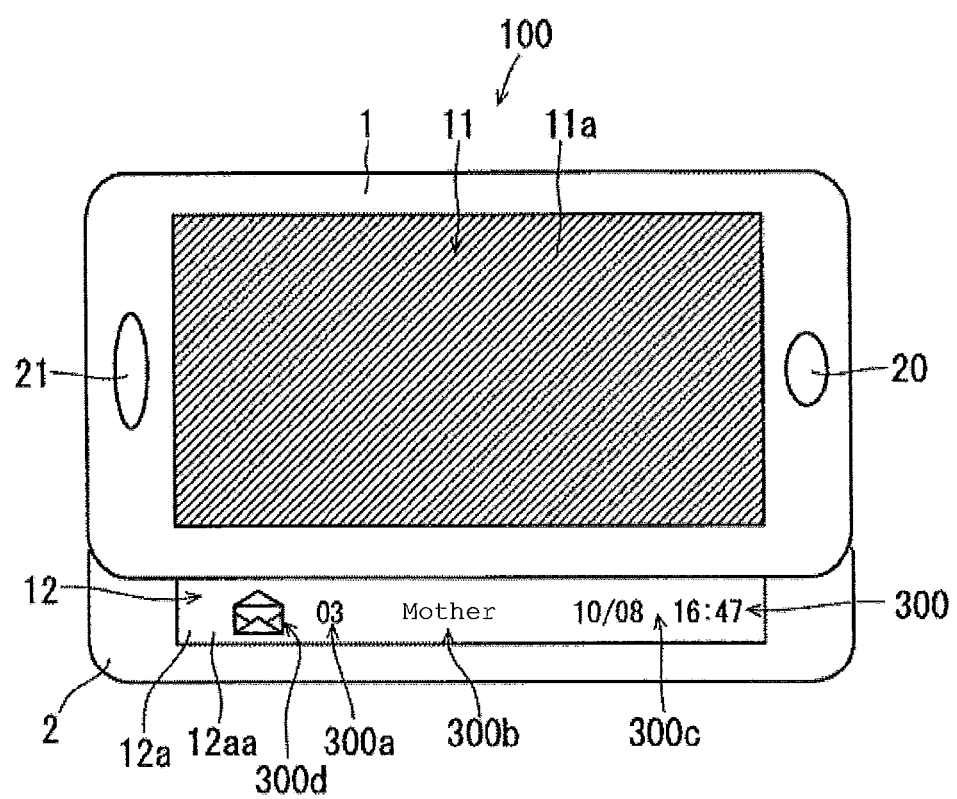
FIG. 16 is an illustration of an exemplary external view of a mobile device according to an embodiment of the disclosure.

FIG. 15 shows a state that a first received mail history 300 is displayed on the exposed part 12aa, by scrolling the display of the exposed part 12aa to the upper side. Further, FIG. 16 shows a state that a second received mail history 300 is displayed on the exposed part 12aa, by scrolling the display of the exposed part 12aa to the further upper side. As shown in FIG. 14 to FIG. 16, the user can display the received mail history 300 which is older than the received mail history 300 displayed at present in the exposed part 12aa in an order from an earliest time of reception 300c, by moving her/his finger to the upper side while touching on the upper side display surface 11a by her/his finger.

Meanwhile, if the user moves her/his finger to the lower side while touching on the upper side display surface 11a by her/his finger, the operation content specifying part 131 specifies the operation content, and the display of the exposed part 12aa of the lower side display surface 12a is scrolled to the lower side. The display of the exposed part 12aa is scrolled to the lower side in accordance with the amount of movement of her/his finger of the user to the lower side. Thus, the user can display on the exposed part 12aa the received mail history 300 which is newer than the received mail history 300 displayed at present, by moving her/his finger to the lower side, while touching on the upper side display surface 11a by her/his finger, in an order from the earliest time of reception 300c.

Status icon 300d shown in FIG. 15 and FIG. 16 shows that the received mail is already opened.

<Display of Both the Received Call History and the Received Mail History>

The operation of the mobile phone 100 when both the received call history and the received mail history are displayed on the exposed part 12aa is explained as follows. If the user moves her/his finger to the upper side while touching on the upper side display surface 11a by her/his finger, a history older than the history displayed at present is displayed on the exposed part 12aa, in an order from the newest one, out of a plurality of received call histories 200 and a plurality of received mail histories 300, being display objects in the storage part 30b. Further, if the user moves her/his finger to the lower side while touching on the upper side display surface 11a by her/his finger, a history which is newer than the history displayed at present is displayed on the exposed part 12aa in an order from the earliest one, out of a plurality of received call histories 200 and a plurality of received mail histories 300, being display objects in the storage part 30b.

Figure 17:
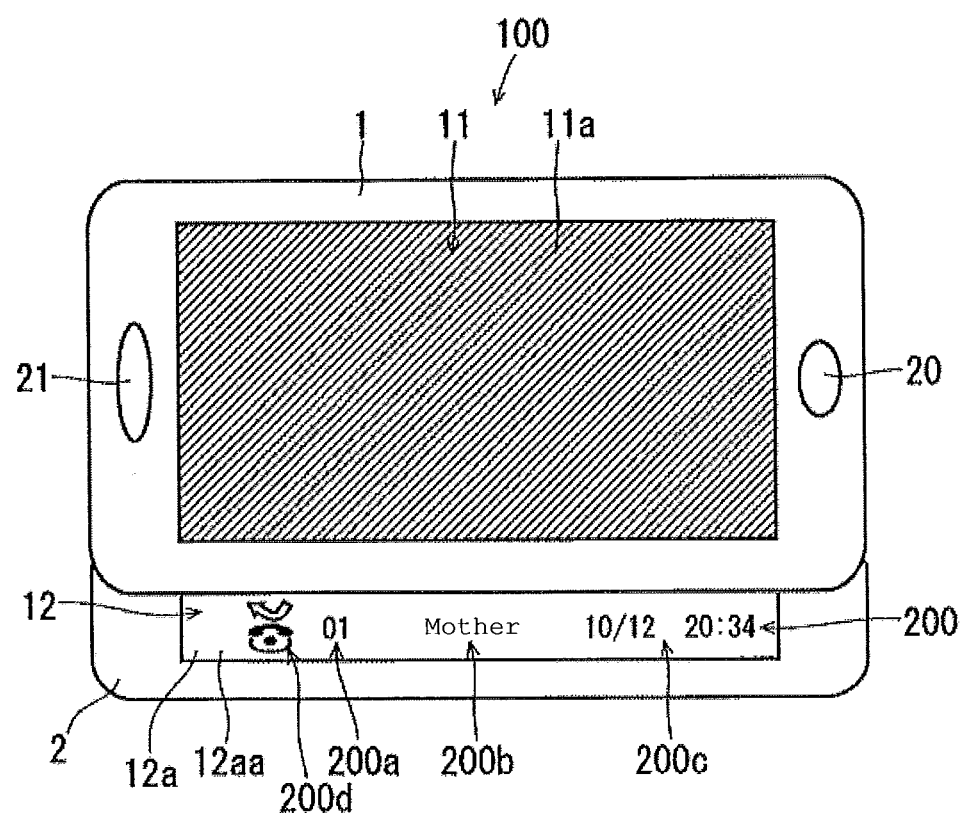
FIG. 17 is an illustration of an exemplary external view of a mobile device according to an embodiment of the disclosure.
Figure 18:
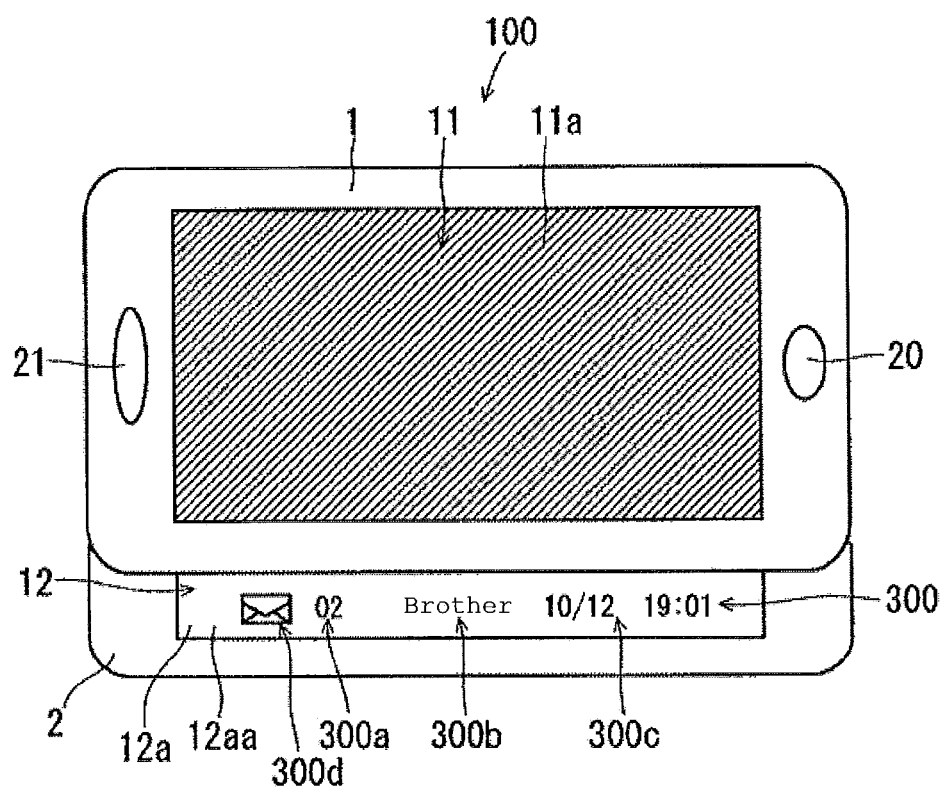
FIG. 18 is an illustration of an exemplary external view of a mobile device according to an embodiment of the disclosure.
Figure 19:
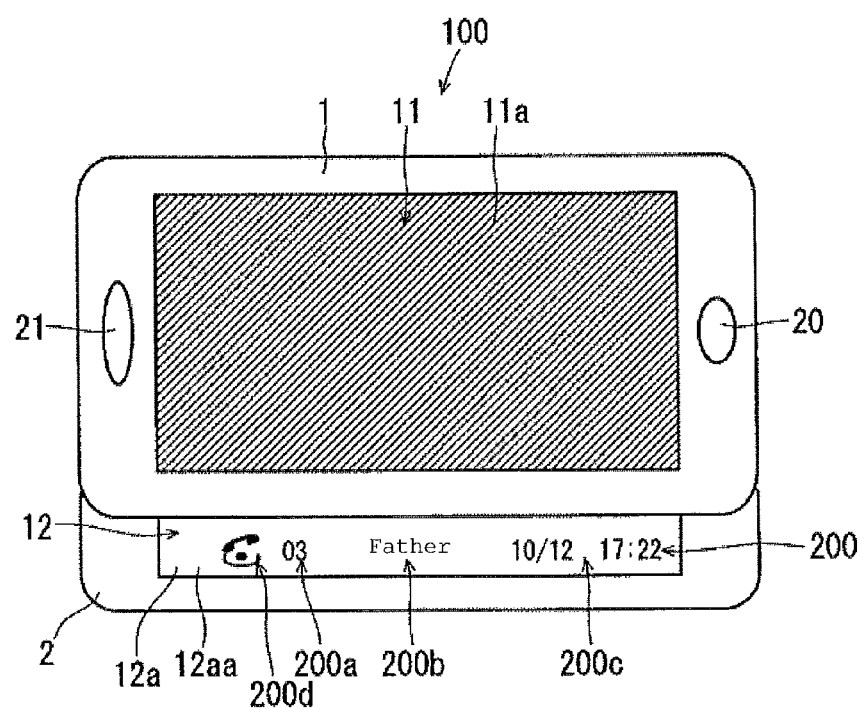
FIG. 19 is an illustration of an exemplary external view of a mobile device according to an embodiment of the disclosure.

In FIG. 17, a newest history is displayed, and in FIG. 18, a second newest history is displayed, and in FIG. 19, a third newest history is displayed, out of the plurality of received call histories 200 and the plurality of received mail histories 300, being display objects in the storage part 30b. When both the received call history 200 and the received mail history 300 are displayed on the exposed part 12aa, the serial number 200a of the received call histories 200 and the serial number 300a of the received mail histories 300 are respectively serial numbers which are given to the received call histories 200 and the received mail histories 300, being display objects in the storage part 30b, in an order from the newest one.

If the user moves her/his finger to the upper side while touching on the upper side display surface 11a in the mobile phone 100 of FIG. 17, the mobile phone 100 is set in a state shown in FIG. 18 and a state shown in FIG. 19 sequentially. Further, if the user moves her/his finger to the lower side in the mobile phone 100 of FIG. 19 while touching on the upper side display surface 11a, the mobile phone 100 is set in the state shown in FIG. 18 and the state shown in FIG. 17 sequentially.

<Selection of the Information Displayed on the Exposed Part>

Figure 20:
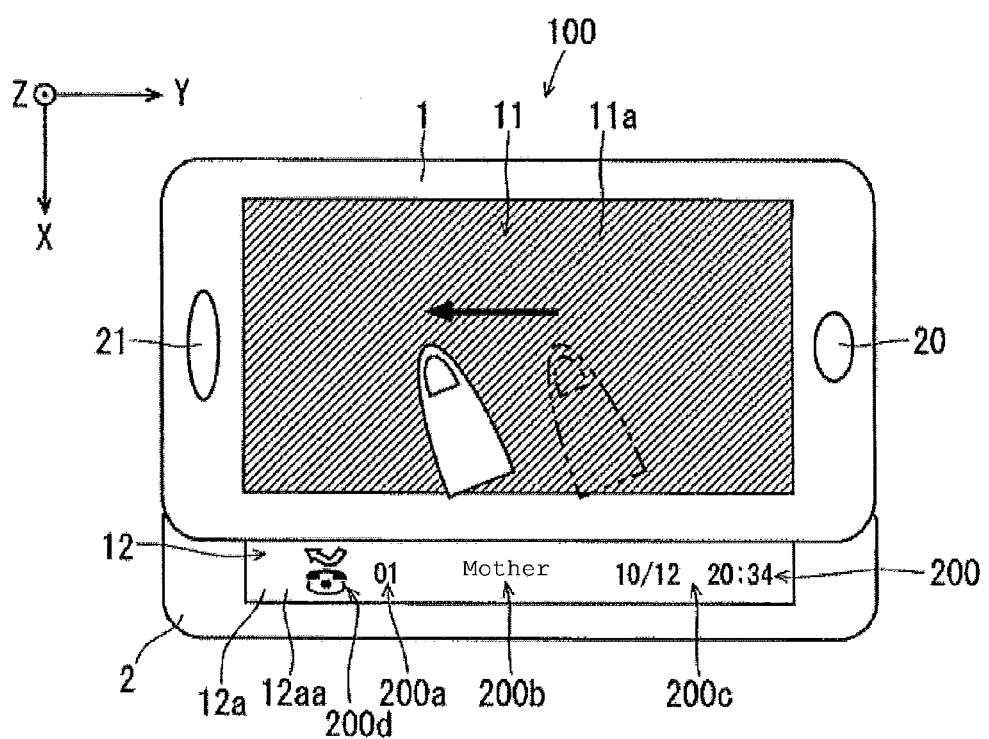
FIG. 20 is an illustration of an exemplary external view of a mobile device according to an embodiment of the disclosure.
Figure 21:
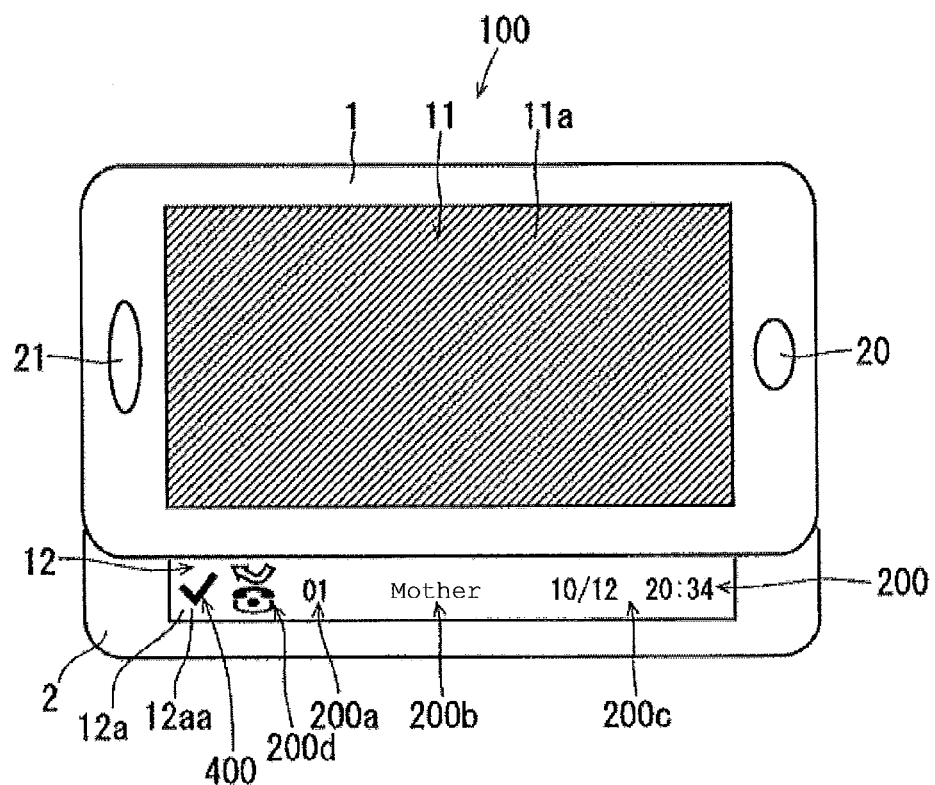
FIG. 21 is an illustration of an exemplary external view of a mobile device according to an embodiment of the disclosure.

In the PO-first active mode, when it is specified by the operation content specifying part 131 that a prescribed operation is performed to the upper side display surface 11a, the mobile phone 100 is set in a state of selecting the information displayed on the exposed part 12aa. According to the embodiment, shown in FIG. 20, if the user moves his/her finger to the left side (−Y direction) while touching on the upper side display surface 11a, with the mobile phone 100 held in the attitude for use, the operation content specifying part 131 specifies the operation content. The mobile phone 100 is then set in a state of selecting the information (received call history in an example of FIG. 20) displayed on the exposed part 12aa. When the mobile phone 100 is set in the state of selecting the information displayed on the exposed part 12aa, as shown in FIG. 21, selection mark 400 showing that the information is already selected, is displayed on the exposed part 12aa, alongside the information.

Figure 22:
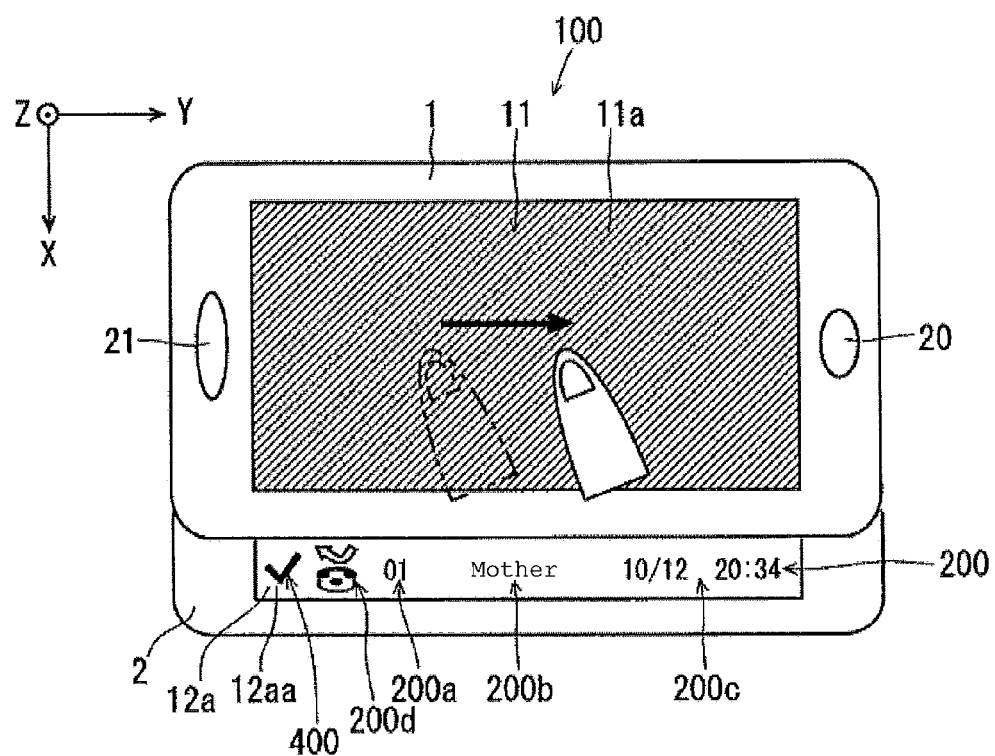
FIG. 22 is an illustration of an exemplary external view of a mobile device according to an embodiment of the disclosure.
Figure 23:
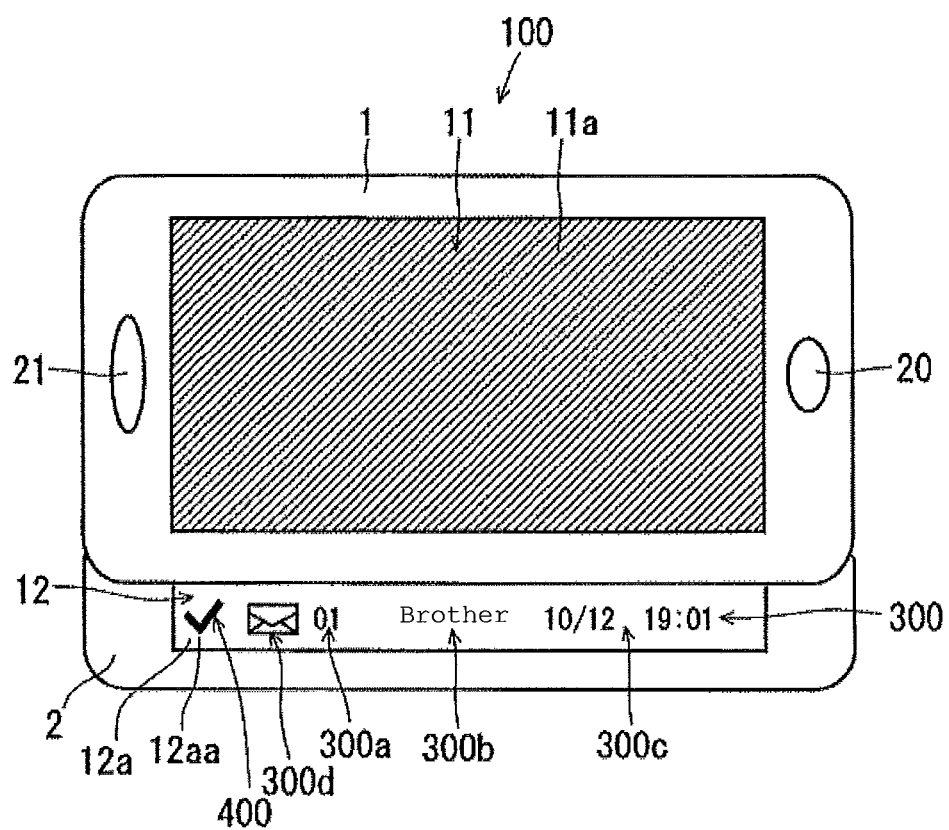
FIG. 23 is an illustration of an exemplary external view of a mobile device according to an embodiment of the disclosure.

Further, as shown in FIG. 22, in a state that the information displayed on the exposed part 12aa is selected, if the user moves his/her finger to the right side (+Y direction) while touching on the upper side display surface 11a by his/her finger, with the mobile phone 100 held in the attitude for use, the operation content specifying part 131 specifies the operation content and a selection of the information displayed on the exposed part 12aa is canceled. Namely, the mobile phone 100 is set in a state of not selecting the information. When the selection of the information displayed on the exposed part 12aa is canceled, the selection mark 400 is deleted from the exposed part 12aa, and the display of the exposed part 12aa is returned to the state of FIG. 20. FIG. 23 shows a state that the received mail history 300 displayed on the exposed part 12aa is selected, and the selection mark 400 is displayed on the exposed part 12aa.

<Operation of the Mobile Phone in a Case of Changing the Operation Mode from PO-First Active Mode>

According to an embodiment, in the PO-first active mode, if the user slides the upper side casing 1 of this mobile phone 100 while selecting the received call history 200 displayed on the exposed part 12aa and the mobile phone 100 is changed to the close state, the mobile phone 100 is set in the CL-active mode and call is made to the communication partner in association with the selected received call history 200. Specifically, in the PO-first active mode, when it is specified by the positional relation specifying part 133 that the positional relation between the upper side casing 1 and the lower side casing 2 is changed from the third positional relation to the first positional relation while selecting the received call histories 200 displayed on the exposed part 12aa, the communication control part 132 controls the radio communication part 31, to make a call to the communication partner in association with the selected received call history. Thus, the user can make a call to the communication partner in association with the selected received call history 200 only by sliding the upper side casing 1.

Figure 24:
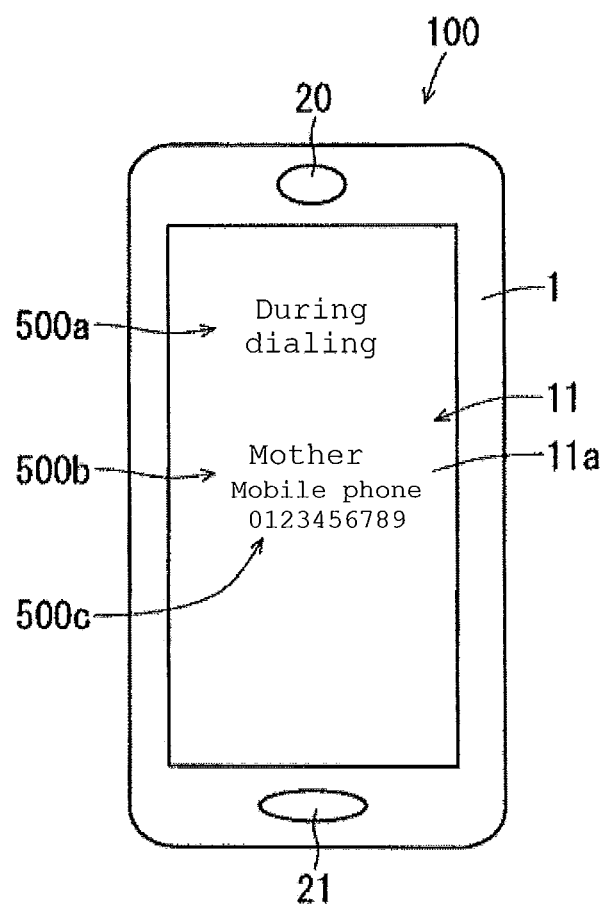
FIG. 24 is an illustration of an exemplary external view of a mobile device according to an embodiment of the disclosure.

FIG. 24 is a view showing an example of the information displayed on the upper side display surface 11a at the time of making a call by the communication control part 132. As shown in FIG. 24, information 500a showing call origination, partner information 500b for specifying the communication partner, and telephone number 500c of the communication partner are displayed on the upper side display surface 11a.

Further, in an embodiment, in the PO-first active mode, if the user slides the upper side casing 1 of the mobile phone 100, and the mobile phone 100 is changed to the close state while selecting the received mail histories 300 displayed on the exposed part 12aa, the mobile phone 100 is set in the CL-active mode, so as to display a browsing screen of the electronic mail in association with the received mail histories 300. Specifically, in the mobile phone 100 set in the PO-first active mode, if it is specified by the positional relation specifying part 133 that the positional relation between the upper side casing 1 and the lower side casing 2 is changed from the third positional relation to the first positional relation while selecting the received mail history 300 displayed on the exposed part 12aa, the browsing screen of the electronic mail in association with the selected received mail history 300 is displayed on the upper side display surface 11a under control of the display control part 130. Thus, the user can confirm the content of the electronic mail in association with the selected received mail history 300, only by sliding the upper side casing 1.

Figure 25:
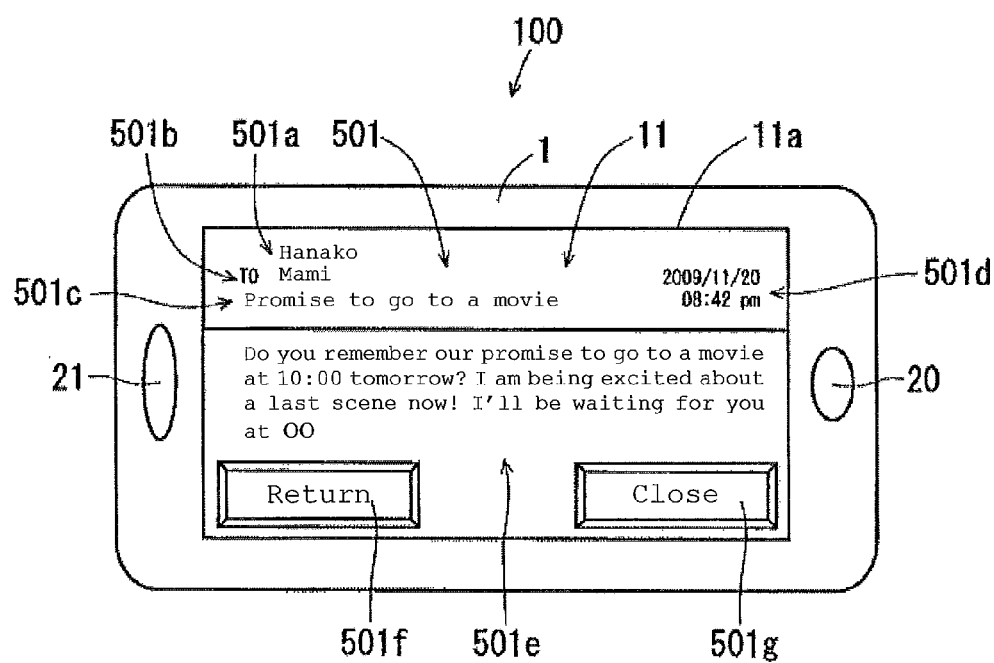
FIG. 25 is an illustration of an exemplary external view of a mobile device according to an embodiment of the disclosure.

FIG. 25 is a view showing an example of a browsing screen 501 of the electronic mail displayed on the upper side display surface 11a. As shown in FIG. 25, sender information 501a showing a sender of the electronic mail, destination address information 501b showing a destination address of this electronic mail, and title 501c of this electronic mail are shown in the browsing screen 501 of the electronic mail. Further, reception time (including date) 501b of the electronic mail, and text 501e of the electronic mail are shown in the browsing screen 501 of the electronic mail. Further, return button 501f for displaying an edit screen of a return mail to the electronic mail, and a close button 501g for ending the display of the browsing screen 501 are shown in the browsing screen 501 of the electronic mail. If the user operates the return button 501f, the edit screen of the return mail, as described below, is displayed on the upper side display surface 11a.

In the mobile phone 100 set in the PO-first active mode, if the user slides the upper side casing 1 of this mobile phone 100 while selecting the received mails 300 displayed on the exposed part 12aa to change the mobile phone 100 to the full open state, the mobile phone 100 is set in the FO-active mode so as to display the edit screen of the return mail to the electronic mail in association with the selected received mail history 300. Specifically, in the PO-first active mode, if it is specified by the positional relation specifying part 133 that the positional relation between the upper side casing 1 and the lower side casing 2 is changed from the third positional relation to the second positional relation while selecting the received mail histories 300 displayed on the exposed part 12aa, the edit screen of the return mail to the electronic mail in association with the selected received mail history 300 is displayed on the lower side display surface 12a under control of the display control part 130. Further, according to an embodiment, in the PO-first active mode, if it is specified by the positional relation specifying part 133 that the positional relation between the upper side casing 1 and the lower side casing 2 is changed from the third positional relation to the second positional relation while selecting the received mail history 300 displayed on the exposed part 12aa, the edit screen 501 of the electronic mail in association with the selected received mail history 300 is displayed on the upper side display surface 11a under control of the display control part 130. Thus, the user can edit the return mail to the electronic mail while confirming the content of the electronic mail in association with the selected received mail history 300, only by sliding the upper side casing 1.

Figure 26:
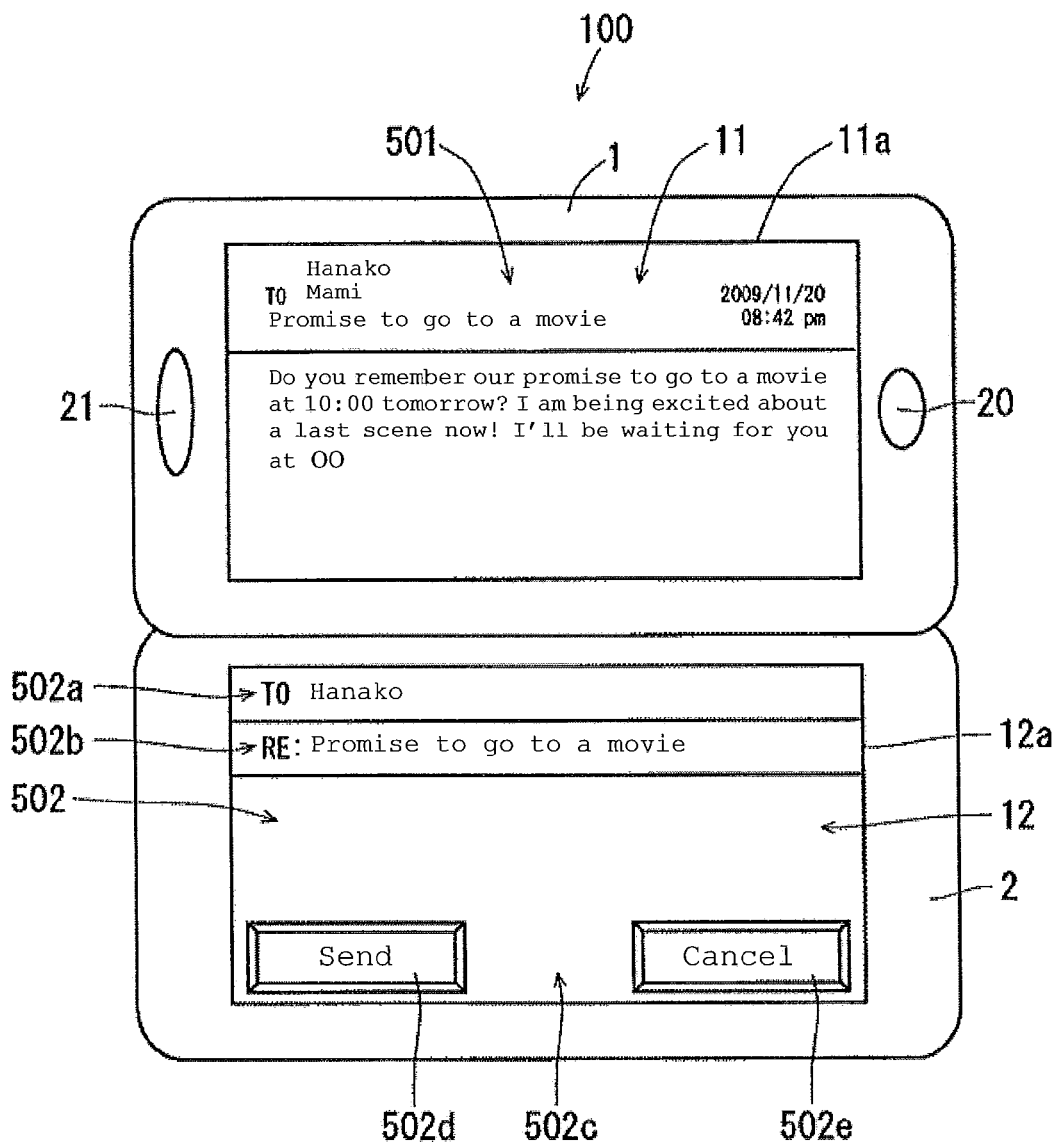
FIG. 26 is an illustration of an exemplary external view of a mobile device according to an embodiment of the disclosure.

FIG. 26 is a view showing an example of the browsing screen 501 of the electronic mail and the edit screen 502 of the return mail displayed on the mobile phone 100. As shown in FIG. 26, destination address 502a showing the destination address of the return mail, and title 502b of the return mail are shown in the edit screen 502 of the return mail displayed on the lower side display surface 12a. Further, partial screen 502c for displaying the text of the return mail is shown in the edit screen 502 of the return mail. Further, send button 502b for sending a prepared return mail, and cancel button 502e for ending the display of the edit screen 502 are shown in the edit screen 502 of the return mail.

In the edit screen 502 of the return mail, if the user operates the partial screen 502c which functions also as an operation button, a text preparation screen is displayed on the lower side display surface 12a. The user can prepare the text of the return mail by operating this text preparation screen. Then, if the user operates the lower side display surface 12a for notifying the mobile phone 100 of a completion of preparing the text of the return mail, the edit screen 502 is displayed on the lower side display surface 12a again. The prepared text is displayed on the partial screen 502c of the edit screen 502. Thereafter, when the user operates the send button 502d, the control part 30 sends the prepared return mail by controlling the radio communication part 31.

In the aforementioned example, the browsing screen 501 of the electronic mail is displayed on the upper side display surface 11a, and the edit screen 502 of the return mail is displayed on the lower side display surface 12a. However, the browsing screen 501 may not be displayed. Further, the edit screen 502 of the return mail may be displayed extending from the upper side display surface 11a to the lower side display surface 12a. Moreover, the edit screen 502 of the return mail may be displayed on the upper side display surface 11a. In this case, it is desirable to display the browsing screen 501 of the electronic mail in the lower side display surface 12a.

Further, according to an embodiment, in the mobile phone 100 set in the PO-first active mode, if the user slides the upper side casing 1 of the mobile phone 100 to change the mobile phone 100 to the full open state while not selecting the history such as the received call history 200 displayed on the exposed part 12aa, the mobile phone 100 is set in the FO-active mode so that the history such as the received call history 200 is listed. Specifically, in the mobile phone 100 set in the PO-first active mode, if it is specified by the positional relation specifying part 133 that the positional relation between the upper side casing 1 and the lower side casing 2 is changed from the third positional relation to the second positional relation while not selecting the received mail history 300, etc., displayed on the exposed part 12aa, a plurality of histories such as received mail histories 300 are simultaneously displayed on the upper side display surface 11a and the lower side display surface 12a, under control of the display control part 130. Thus, the user can confirm the list of the histories such as received mail histories 300, only by sliding the upper side casing 1.

Figure 27:
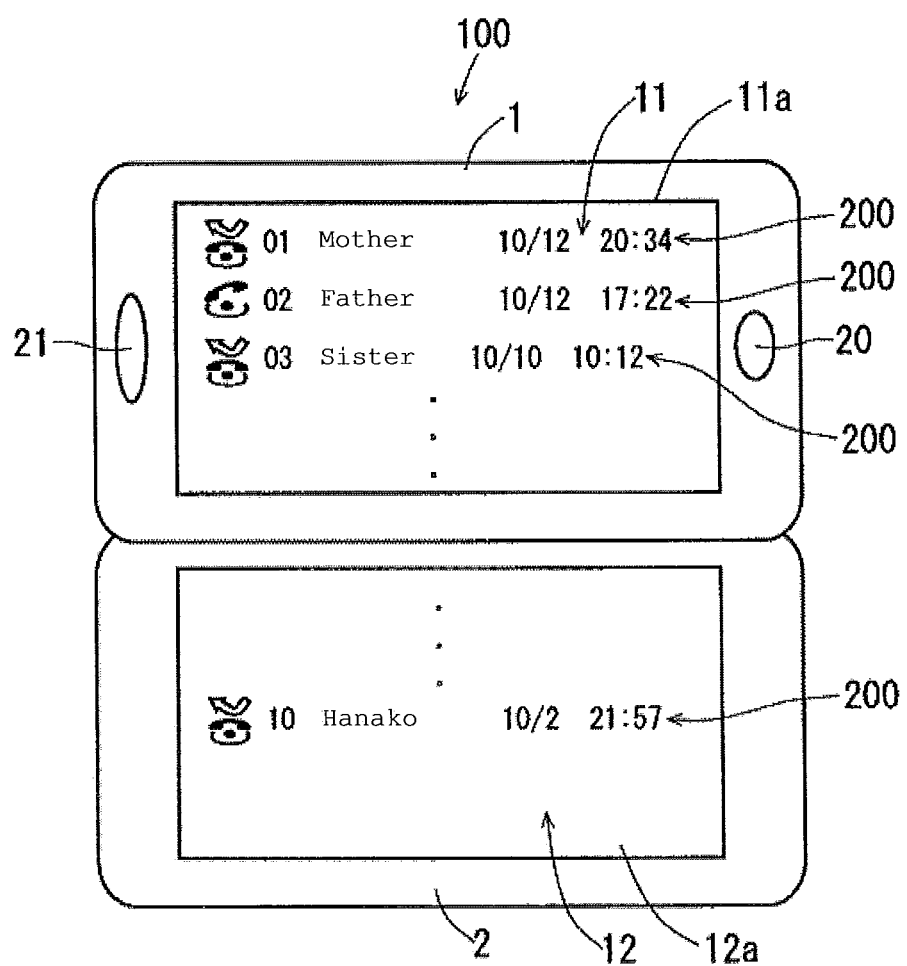
FIG. 27 is an illustration of an exemplary external view of a mobile device according to an embodiment of the disclosure.

FIG. 27 is a view showing an example of a state that the list of the received call history 200 is displayed on the upper side display surface 11a and the lower side display surface 12a, in the mobile phone 100 at the time of displaying the received call history 200 in the exposed part 12aa. In the example shown in FIG. 27, 10 received call histories 200 are displayed extending from the upper side display surface 11a to the lower side display surface 12a.

Figure 28:
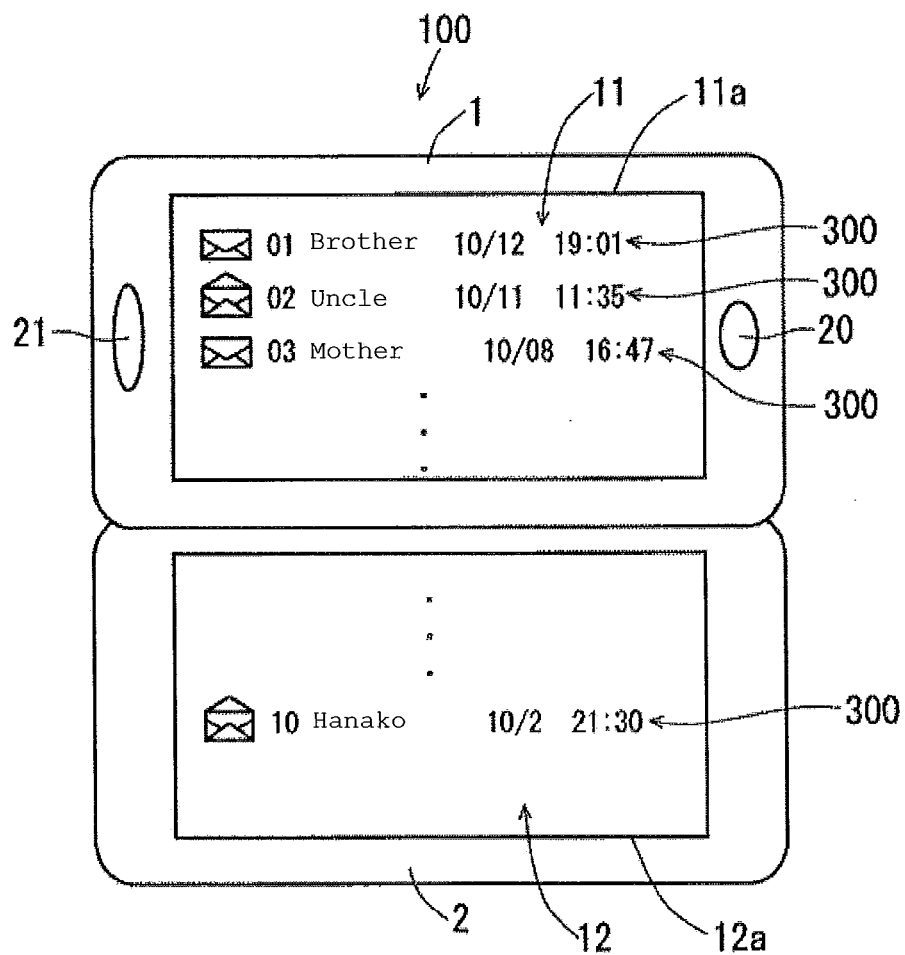
FIG. 28 is an illustration of an exemplary external view of a mobile device according to an embodiment of the disclosure.

FIG. 28 is a view showing an example of a state that the list of the received mail histories 300 on the upper side display surface 11a and the lower side display surface 12a, in the mobile phone 100 at the time of displaying the received mail history 300 in the exposed part 12aa. In the example shown in FIG. 28, 10 received mail histories 300 are displayed extending from the upper side display surface 11a to the lower side display surface 12a.

Figure 29:
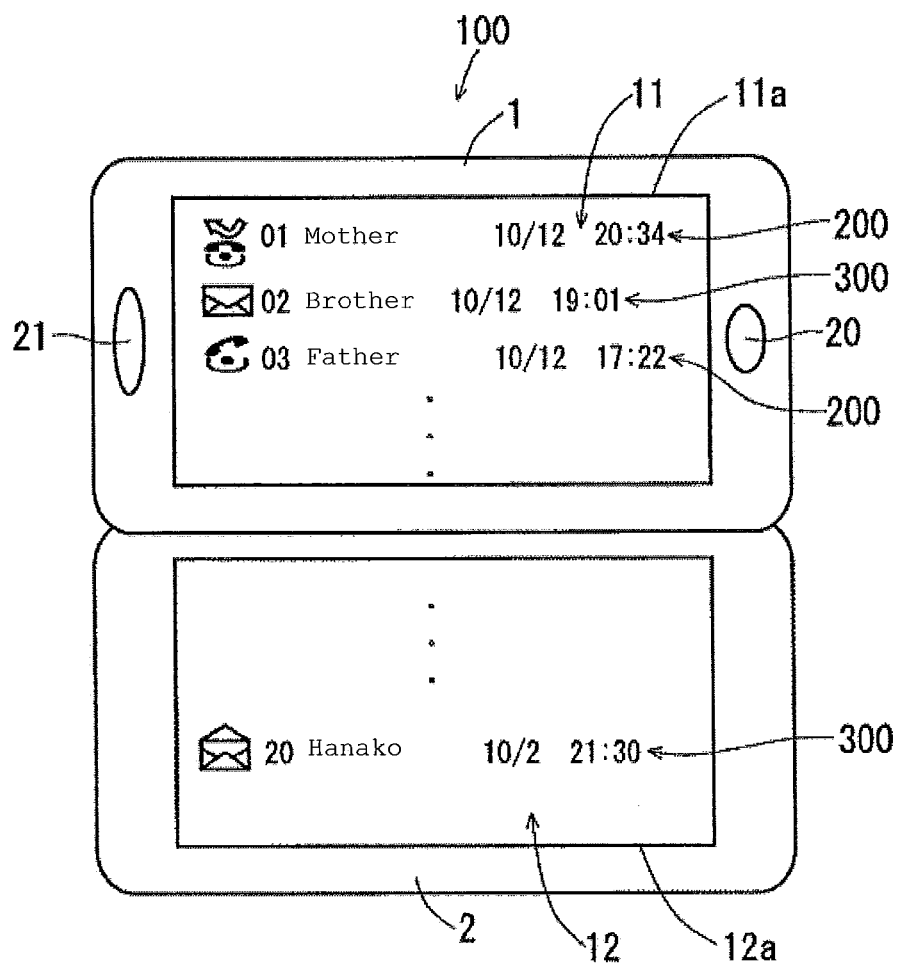
FIG. 29 is an illustration of an exemplary external view of a mobile device according to an embodiment of the disclosure.

FIG. 29 is a view showing an example of a state that the list of the received call histories 200 and the received mail histories 300 is displayed on the upper side display surface 11a and the lower side display surface 12a, in the mobile phone 100 at the time of displaying both the received call history 200 and the received mail history 300 in the exposed part 12aa. In the example shown in FIG. 29, 10 received call histories 200 and 10 received mail histories 300 are displayed extending from the upper side display surface 11a to the lower side display surface 12a in an order from a newest one.

In the examples shown in FIG. 27 to FIG. 29, the call and mail history is listed by using the upper side display surface 11a and the lower side display surface 12a. However, the call and mail history may be displayed on a list only in either one of the upper side display surface 11a and the lower side display surface 12a.

<Setting for the Display in the PO-First Active Mode>

According to an embodiment, various settings can be made for the display of the exposed part 12aa in the mobile phone 100 set in the PO-first active mode. For example, the user can set the information regarding the display in the exposed part 12aa, namely, can set whether the exposed part 12aa displays the received call history or the received mail history, or both the received call history and the received mail history. Further, the user can set a luminance of the exposed part 12aa. In addition, the user can set whether the information such as received call history, etc., displayed on the exposed part 12aa should be limited.

Figure 30:
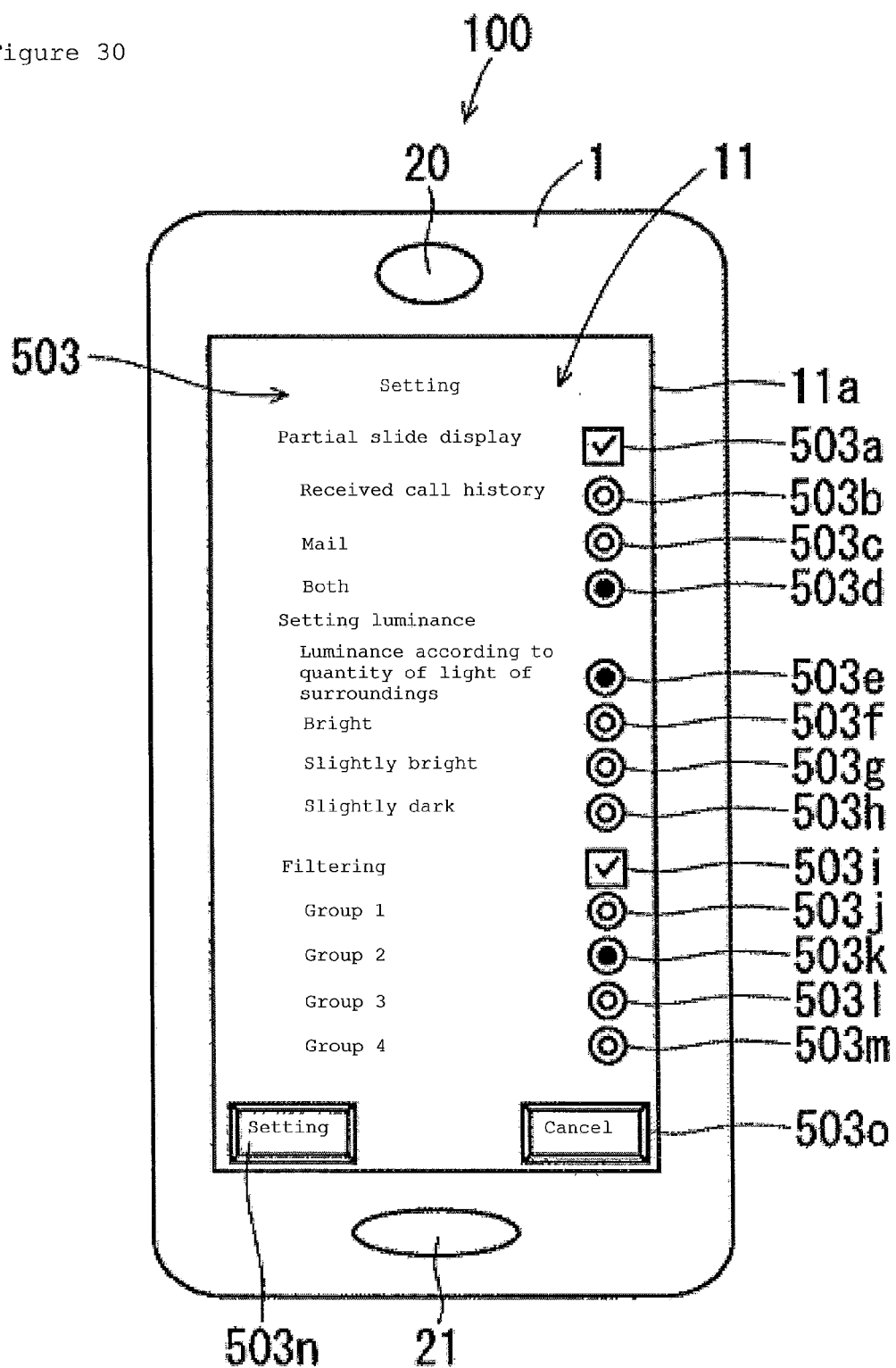
FIG. 30 is an illustration of an exemplary external view of a mobile device according to an embodiment of the disclosure.

FIG. 30 is a planar view showing the mobile phone 100 in the close state wherein a setting screen 503 for setting the display of the exposed part 12aa is displayed. When a prescribed operation is performed to the upper side display surface 11a of the mobile phone 100 in the close state, the setting screen 503 is displayed on the upper side display surface 11a. A plurality of selection buttons 503a to 503m are shown in this setting screen 503, for selecting each kind of behavior condition in the mobile phone 100 regarding the display of the exposed part 12aa. Further, a setting button 503n for setting to the mobile phone 100 the behavior condition selected by operating the selection buttons 503a to 503m, and a cancel button 503o for ending the display of the setting screen 503 are shown in the setting screen 503.

The selection button 503a is an operation button for selecting the behavior that a partial slide display is performed by the mobile phone 100. In this document, the partial slide display means that the information regarding the received call history, etc., is displayed on the exposed part 12aa of the lower side display surface 12a in the mobile phone 100 set in the PO-first active mode. Accordingly, when the behavior condition such that the partial slide display is performed in the mobile phone 100 by operating the selection button 503a, is not set in the mobile phone 100, the information such as received call history is not displayed on the exposed part 12aa, even although the display of the lower side display surface 12a is set in the on state in the mobile phone 100 in the PO-first active mode.

The operation of the selection buttons 503b to 503d is effective, when the selection button 503a is operated and the partial slide display is selected to be performed by the mobile phone 100. The selection button 503b is the operation button for selecting the received call history to be displayed on the exposed part 12aa. The selection button 503c is an operation button for selecting the received mail history to be displayed on the exposed part 12aa. The selection button 503d is an operation button for selecting both the received call history and the received mail history to be displayed on the exposed part 12*aa*.

Selection button 503*e* is an operation button for selecting the luminance of the exposed part 12*aa* to be automatically set, according to a quantity of light (brightness) of surroundings of the mobile phone 100. Selection button 503*f* is an operation button for selecting a value of the luminance of the exposed part 12*aa* to be set to a prescribed high value. Selection button 503*g* is an operation button for selecting the value of the luminance of the exposed part 12*aa* to be set to a prescribed slightly high value. Selection button 503*h* is an operation button for selecting the value of the luminance of the exposed part 12*aa* to be set to a prescribed slightly low value.

Selection button 503*i* is an operation button for selecting the information displayed on the exposed part 12*aa* to be limited (filtering). Operations of the selection buttons 503*j* to 503*m* are effective, when the selection button 503*i* is operated to select a state that the information displayed on the exposed part 12*aa* is limited. The selection button 503*j* is an operation button for selecting a state that the information such as received call history displayed on the exposed part 12*aa* is limited to the information regarding the communication partner who belongs to group 1. Selection button 503*k* is an operation button for selecting a state that the information displayed on the exposed part 12*aa* is limited to the information regarding the \communication partner who belongs to group 2. Selection button 503*l* is an operation button for selecting a state that the information displayed on the exposed part 12*aa* is limited to the information regarding the communication partner who belongs to group 3. Selection button 503*m* is an operation button for selecting a state that the information displayed on the exposed part 12*aa* is limited to the information regarding the communication partner who belongs to group 4.

In the mobile phone 100 according to this embodiment, an address book file is stored in the storage part 30*b*. Personal information regarding a plurality of persons is registered in the address book file. Each personal information comprises, for example, name, telephone number, electronic address, and group number (any one of 1-4) to which a person having the personal information belongs.

By operating each one of the selection buttons 503*e* to 503*m* of the setting screen 503, the behavior condition corresponding thereto is selected, and the display is changed. Then, by operating the selection buttons 503*a* to 503*m* again, the selection of the corresponding behavior condition is canceled, and the display is turned back. In the example of FIG. 30, behavior conditions corresponding to selection buttons 503*a*, 503*d*, 503*e*, 503*i*, and 503*k* are selected. Then, by operating the setting button 503*n*, the selected behavior condition is set in the mobile phone 100. Thus, the mobile phone 100 is operated based on the behavior condition selected by the selection buttons 503*a* to 503*m*.

When the behavior condition is set in the mobile phone 100 by operating the selection buttons 503*a* and 503*b* for displaying only the received call history in the exposed part 12*aa*, displays are made as shown in FIG. 9 to FIG. 13 in a case that the mobile phone 100 is set in the PO-first active mode. When the behavior condition is set in the mobile phone 100 by operating the selection buttons 503*a* and 503*c* for displaying the received mail history in the exposed part 12*aa*, displays are made as shown in FIG. 14 to FIG. 16 in a case that the mobile phone is set in the PO-first active mode. When the behavior condition is set in the mobile phone 100 by operating the selection buttons 503*a* and 503*d* for displaying both the received call history and the received mail history in the exposed part 12*aa*, displays are made as shown in FIG. 17 to FIG. 19 in a case that the mobile phone 100 is set in the PO-first active mode.

Further, when the behavior condition is set in the mobile phone 100 by operating the selection button 503*e* for automatically setting the luminance of the exposed part 12*aa* according to the quantity of light (brightness) of the surroundings of the mobile phone 100, the lower side display part 12 sets the luminance of the backlight light source according to the quantity of light of the surroundings, in the mobile phone 100 set in the PO-first active mode. The mobile phone 100 comprises a light quantity detection part (not shown) for detecting the quantity of light of the surroundings, and based on a detection result of this light quantity detection part, the lower side display part 12 adjusts the luminance of the backlight light source. Thus, the luminance of the exposed part 12*aa* of the lower side display surface 12*a* becomes automatically a proper value according to the quantity of light of the surroundings.

Further, when the behavior condition is set in the mobile phone 100 by operating the selection button 503*f*, for setting the value of the luminance of the exposed part 12*aa* to be a prescribed high value, the lower side display part 12 sets the value of the luminance of the backlight light source to be the prescribed high value, in the mobile phone 100 set in the PO-first active mode. When the behavior condition is set in the mobile phone 100 by operating the selection button 503*g* for setting the value of the luminance of the exposed part 12*aa* to be a prescribed slightly high value, or when the behavior condition is set in the mobile phone 100 by operating the selection button 503*h* for setting the value of the luminance of the expose part 12*aa* to be the prescribed slightly low value, the mobile phone 100 in the PO-first active mode sets the luminance of the exposed part 12*aa* according to the set behavior condition.

Further, when the behavior condition is set in the mobile phone 100 by operating the selection buttons 503*i* and 503*j* for limiting the information such as received call history displayed on the exposed part 12*aa* to the information regarding the communication partner who belongs to group 1, the history regarding the communication partner who belongs to the group 1 is displayed on the exposed part 12*aa*, in the mobile phone 100 set in the PO-first active mode. Specifically, when the received call history is displayed on the exposed part 12*aa*, the display control part 130 refers to the address book file in the storage part 30*b*, and determines the received call history regarding a sender who belongs to the group 1, out of several dozen received call histories stored in the storage part 30*b*, to be displayed on the exposed part 12*aa*. Further, when the received mail history is displayed on the exposed part 12*aa*, the display control part 130 refers to the address book file in the storage part 30*b*, and determines the received mail history regarding a sender who belongs to the group 1, out of several dozen received mail histories stored in the storage part 30*b*, to be displayed on the exposed part 12*aa*. Then, when both the received call history and the received mail history are displayed on the exposed part 12*aa*, the display control part 130 refers to the address book file in the storage part 30*b*, and determines the received call history regarding the sender who belongs to the group 1, and the received mail history regarding the sender who belongs to the group 1, out of the received call histories and the received mail histories stored in the storage part 30*b*, to be displayed on the exposed part 12*aa*. When the behavior conditions corresponding to the selection buttons 503*k* to 503*m* are set as well, the mobile phone 100 similarly behaves.

The setting screen 503 may be displayed on the mobile phone 100 in the full open state. In this case, the setting screen 503 may be displayed extending from the upper side display surface 11a to the lower side display surface 12a, or may be displayed on either one of the upper side display surface 11a and the lower side display surface 12a.

Further, the setting screen 503 may have a selection button for selecting the received call history displayed on the exposed part 12aa to be limited to the received call history regarding the call during absence (received call history 200 as shown in FIG. 9), and also may have a selection button for selecting the received mail history displayed on the exposed part 12aa to be limited to the received mail history regarding an electronic mail which is an unopened received mail displayed on the exposed part 12aa (received mail history 300 as shown in FIG. 14).

As described above, when the mobile phone 100 behaves in the partially open state and in the PO-first active mode, the display of the entire area of the upper side display surface 11a is set in the off state, and also the information displayed on the exposed part 12aa of the lower side display surface 12a can be switched. Accordingly, light emitted from the display surface of the mobile phone 100 can be suppressed, while displaying lots of information by the mobile phone 100. Therefore, even when the received call history is confirmed, which are displayed by the mobile phone 100 in a dark place such as a movie theater, it can be inhibited that the light emitted from the mobile phone 100 is a hindrance to surroundings. Further, even when the received call history displayed on the mobile phone 100 is confirmed while sleeping, it can be inhibited that the light emitted from a display surface of the mobile phone is glaring. Further, power consumption of the mobile phone 100 can be reduced.

Further, as described above, by scrolling the display of the exposed part 12aa to switch the information displayed on the exposed part 12aa, the user can switch the information while confirming the information piece by piece In addition, as described above, by setting the display in the off state, which is the display of the part excluding the exposed part 12aa on the lower side display surface 12a, the light emitted from the display surface of the mobile phone 100 can be further suppressed and also the power consumption of the mobile phone 100 can be reduced.

In the aforementioned example, the information displayed on the exposed part 12aa is switched by a user moving her/his vertically while touching on the upper side display surface 11a with the finger. However, the information displayed on the exposed part 12aa may be switched by other operation performed to the upper side display surface 11a. For example, next history may be displayed on the exposed part 12aa, each time the user touches on the upper side display surface 11a with the finger and immediately letting it go.

Further, in the aforementioned example, one received call history is displayed on the exposed part 12aa by one line. However, a plurality of call histories may be displayed by a plurality of lines.

Further, in the aforementioned example, the PO-first active mode—the PO-third active mode are provided as the operation modes of the mobile phone 100 in the partially open state. However, only the PO-first active mode may be provided. In this case, when the mobile phone 100 in the CL-active mode is set in the partially open state, the operation mode is changed to the PO-first active mode, and when the mobile phone 100 in the FO-active mode is set in the partially open state, the mode is changed to the PO-first active mode.

Furthermore, in the aforementioned example, the control part 30 comprises the storage part 30b. However, the storage part 30b may exist separately from the control part 39.

First Modified Example

In the aforementioned example, the received call history and the received mail history are displayed on the exposed part 12aa of the lower side display surface 12a. However, other information may be displayed. For example, delivered news from a Web server may be displayed on the exposed part 12aa. Next, the behavior of the mobile phone 100 when the delivered news from the Web server is displayed on the exposed part 12aa is described.

Figure 31:
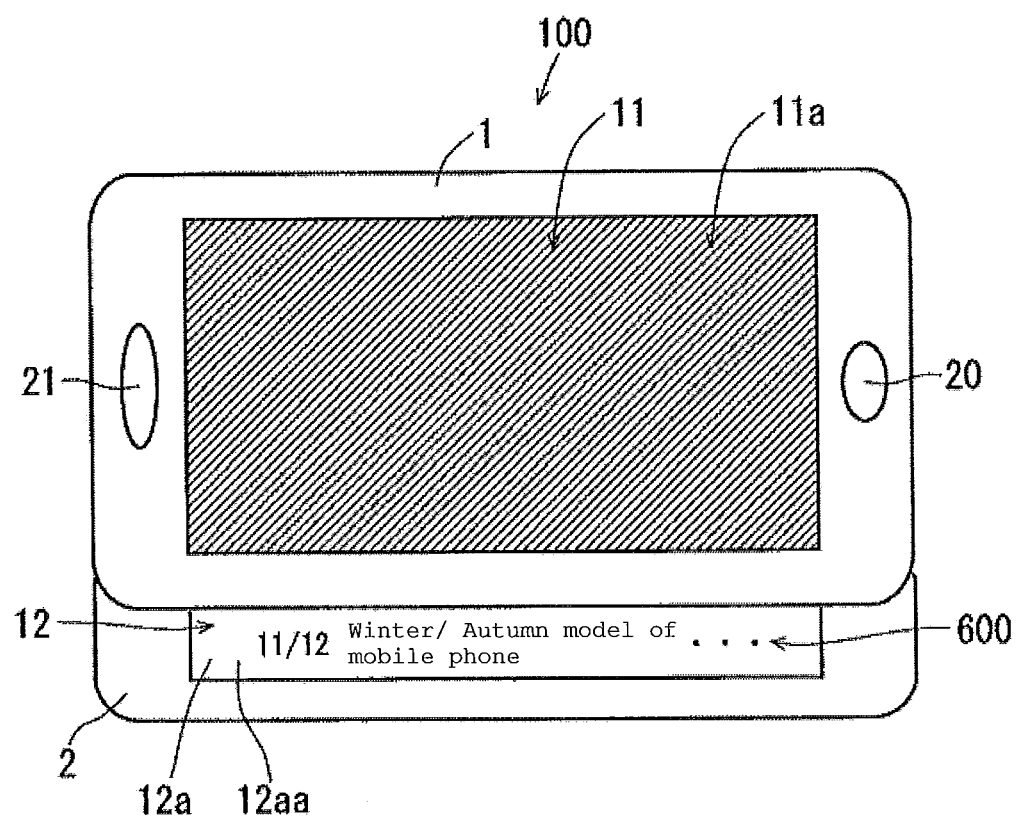
FIG. 31 is an illustration of an exemplary external view of a mobile device according to an embodiment of the disclosure.

The communication control part 132 acquires via the radio communication part 31 the delivered news delivered regularly or irregularly from the Web server and stores it in the storage part 30b, by using RSS reader, etc. Then, when the mobile phone 100 is set in the PO-first active mode, newest delivered news in the storage part 30b is displayed on the exposed part 12aa by the display control part 130. FIG. 31 is a view showing an example of a state that delivered news 600 from the Web server is displayed on the exposed part 12aa. In the exposed part 12aa, the delivered news 600 is displayed so that characters flow from right to left.

Figure 32:
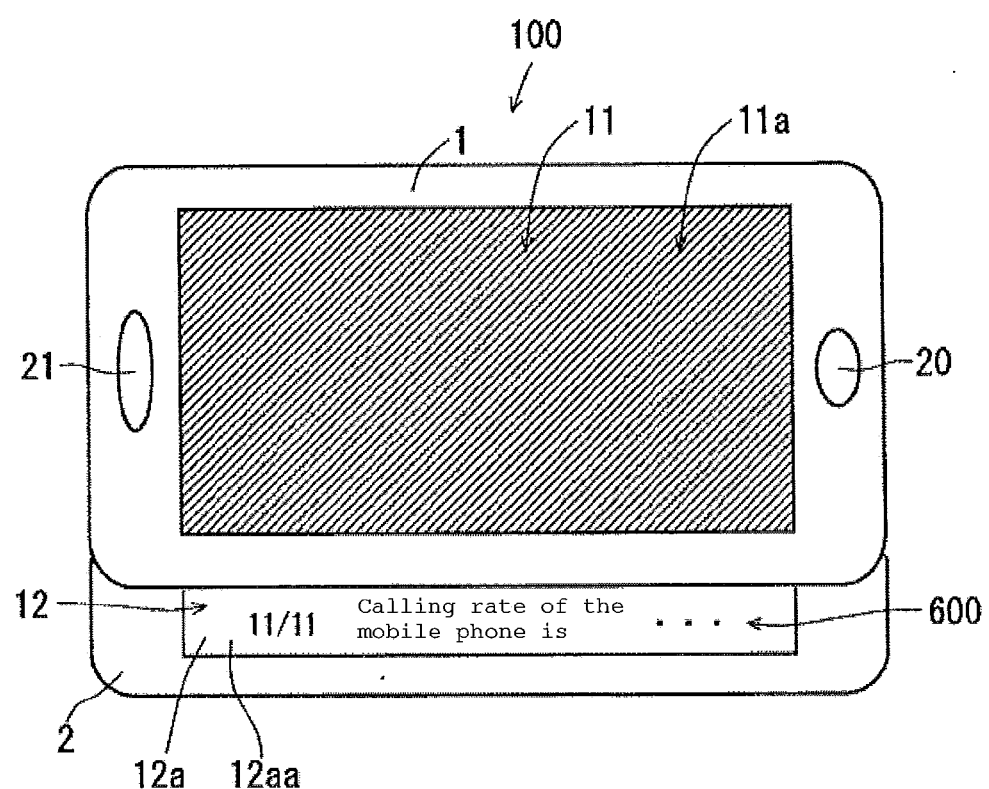
FIG. 32 is an illustration of an exemplary external view of a mobile device according to an embodiment of the disclosure.

Further, if the user moves her/her finger to the upper side while touching on the upper side display surface 11a with her/his finger, with the mobile phone 100 held in the attitude for use, the operation content specifying part 131 specifies its operation content, so that the display in the exposed part 12aa of the lower side display surface 12a is scrolled to the upper side. Thus, similarly to the case of displaying the received call history, delivered news 600 older than the delivered news 600 displayed on the exposed part 12aa at present is displayed on the exposed part 12aa. FIG. 32 is a view showing an example of a state that the delivered news 600 older than the delivered news 600 of FIG. 31 is displayed on the exposed part 12aa.

If the user moves her/his finger to the lower side while touching on the upper side display surface 11a with her/her finger of the user, with the mobile phone 100 held in the attitude for use, the operation content specifying part 131 specifies the operation content, so that the display of the exposed part 12aa is scrolled to the lower side. Thus, similarly to the case of displaying the received call history, delivered news 600 newer than the delivered news 600 displayed on the exposed part 12aa at present is displayed on the exposed part 12aa.

Figure 33:
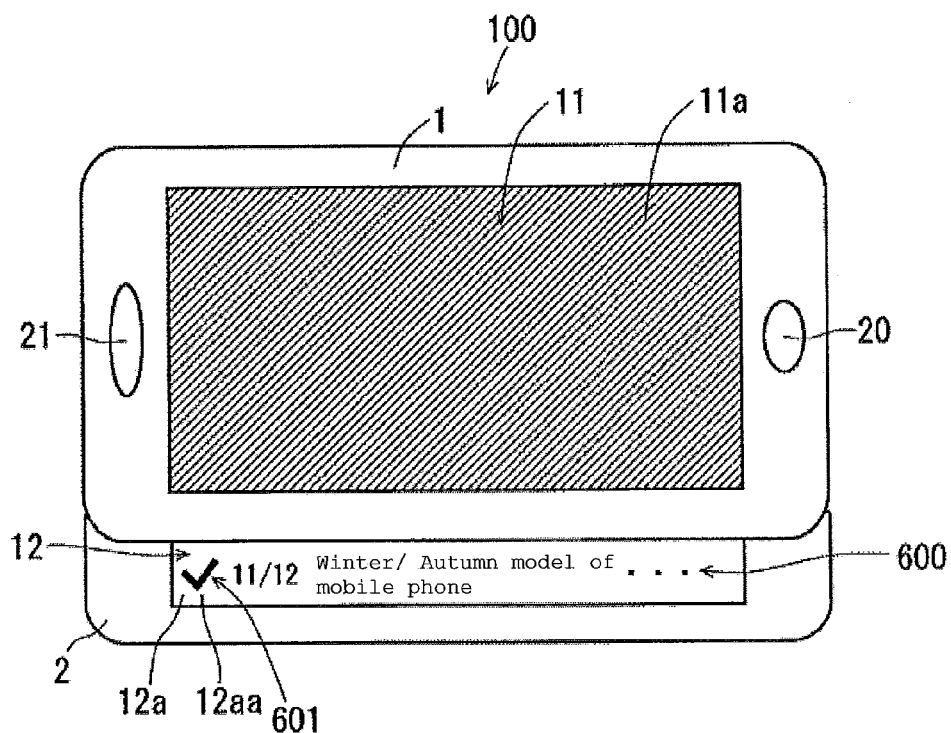
FIG. 33 is an illustration of an exemplary external view of a mobile device according to an embodiment of the disclosure.

Further, if the user moves her/his finger to the left side while touching on the upper side display surface 11a with her/his finger, while the mobile phone 100 held in the attitude for use, the operation content specifying part 131 specifies the operation content, so that the delivered news 600 displayed on the exposed part 12aa is selected. When the delivered news 600 displayed on the exposed part 12aa is selected, as shown in FIG. 33, selection mark 601 showing that the delivered news 600 is selected, is displayed on the exposed part 12aa alongside this delivered news 600.

Further, if the user moves her/his finger to the right side while touching on the upper side display surface 11a with her/his finger, with the mobile phone 100 held in the attitude for use in a state that the delivered news 600 is selected, the operation content specifying part 131 specifies the operation content, and the selection of the delivered news 600 displayed on the exposed part 12aa is canceled. When the selection of the delivered news 600 is canceled, the selection mark 601 is deleted from the exposed part 12aa.

Figure 34:
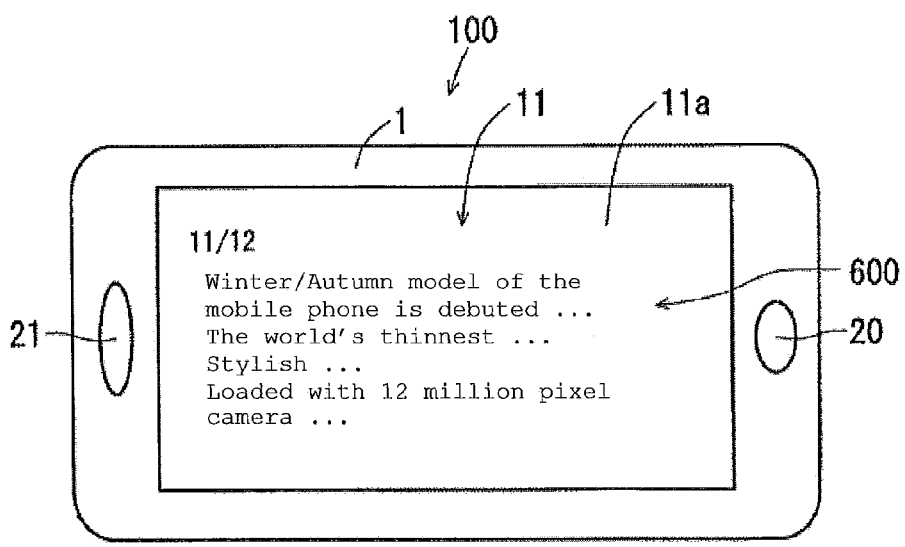
FIG. 34 is an illustration of an exemplary external view of a mobile device according to an embodiment of the disclosure.

In the PO-first active mode, if the user slides the upper side casing 1 of the mobile phone 100 while selecting the delivered news 600 displayed on the exposed part 12aa so that the mobile phone 100 is set in the close state, as shown in FIG. 34, the delivered news 600 is displayed on the entire body of the upper side display surface 11a. Further, in the PO-first active mode, if the user slides the upper side casing 1 of the mobile phone 100 while selecting the delivered news 600 displayed on the exposed part 12aa so that the mobile phone 100 is set in the full open state, the delivered news 600 is displayed extending from the upper side display surface 11a to the lower side display surface 12a. Note that in this case, the delivered news 600 may be displayed on either one of the upper side display surface 11a and the lower side display surface 12a.

Figure 35:
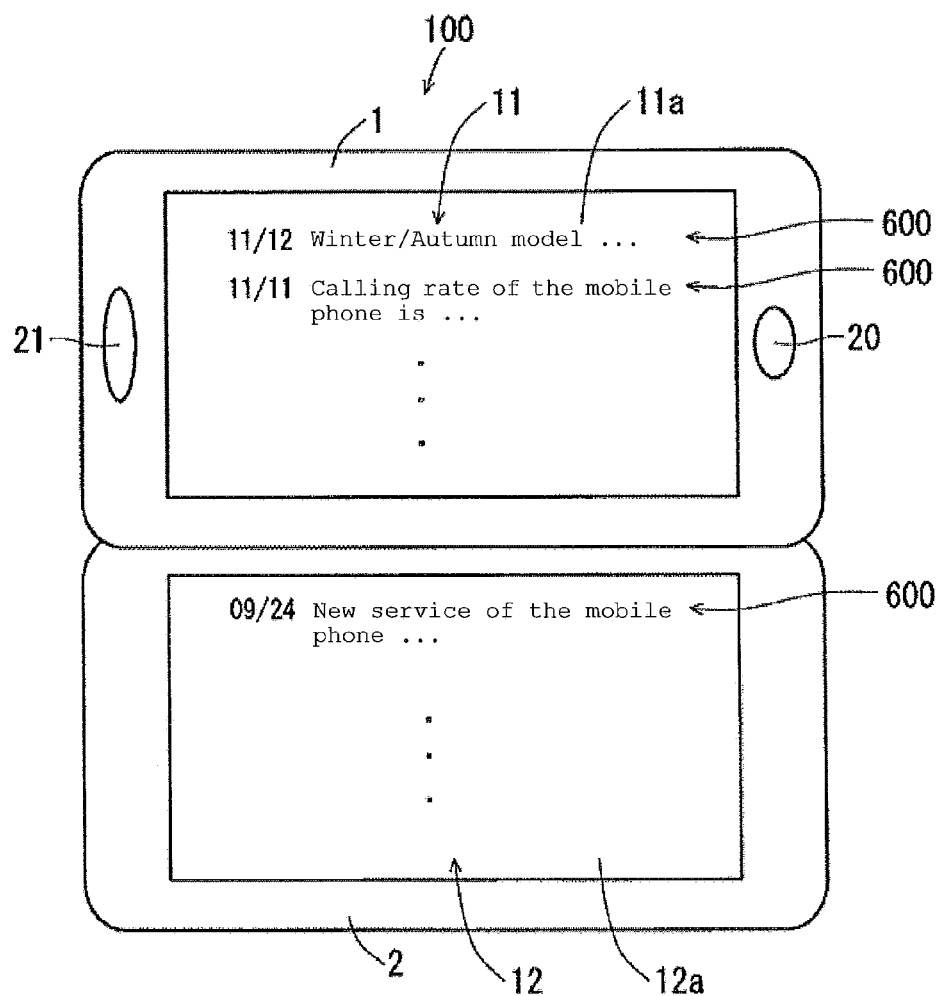
FIG. 35 is an illustration of an exemplary external view of a mobile device according to an embodiment of the disclosure.

Further, in the PO-first active mode, if the user slides the upper side casing 1 to thereby change the mobile phone 100 to the full open state while not selecting the delivered news 600 displayed on the exposed part 12aa, as shown in FIG. 35, the delivered news 600 is listed using both the upper side display surface 11a and the lower side display surface 12a.

Thus, if the delivered news is displayed on the expose part 12aa, a selection button can be provided to the setting screen 503 of FIG. 30 for selecting information (e.g., delivered news) to be displayed on the exposed part 12aa. Whereby, the user can select any one of the display of the received call history, display of the received mail history, display of both the received call history and received mail history, and the display of the delivered news.

Second Modified Example

In the aforementioned example, the information set in the setting screen 503 is displayed on the exposed part 12aa, irrespective of the attitude of the mobile phone 100. However, the kind of the information displayed on the exposed part 12aa may be changed, according to the attitude of the mobile phone 100 detected by the attitude detection part 32.

Figure 36:
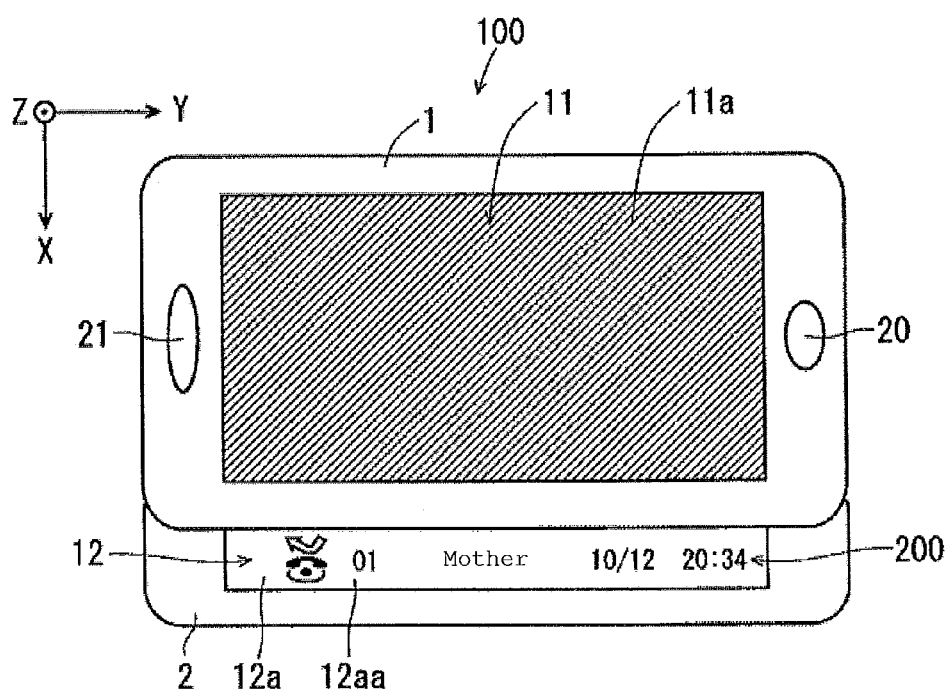
FIG. 36 is an illustration of an exemplary external view of a mobile device according to an embodiment of the disclosure.

For example, as shown in FIG. 36, if the attitude detection part 32 detects the attitude of the mobile phone 100 wherein the voice output part 20 is positioned at the right side and the voice input part 21 is positioned at the left side on the upper side display surface 11a, the received call history 200 is displayed on the exposed part 12aa.

Figure 37:
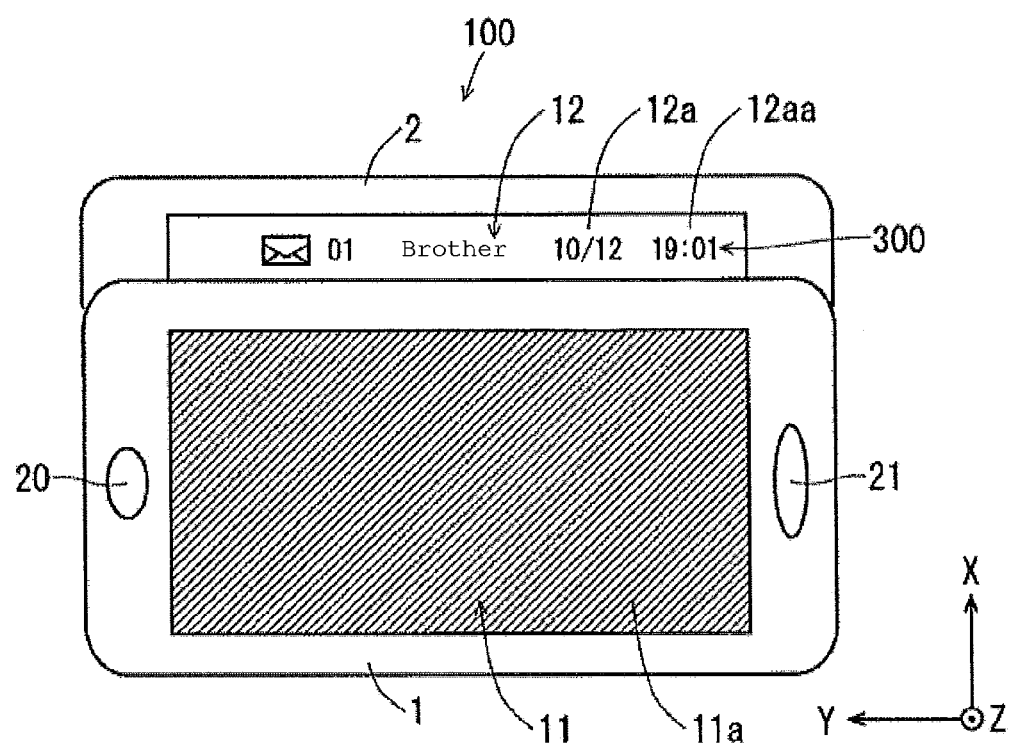
FIG. 37 is an illustration of an exemplary external view of a mobile device according to an embodiment of the disclosure.

Further, as shown in FIG. 37, if the attitude detection part 32 detects the attitude of the mobile phone 100 wherein the voice output part 20 is positioned at the left side and the voice input part 21 is positioned at the right side on the upper side display surface 11a, the received mail history 300 is displayed on the exposed part 12aa.

Figure 38:
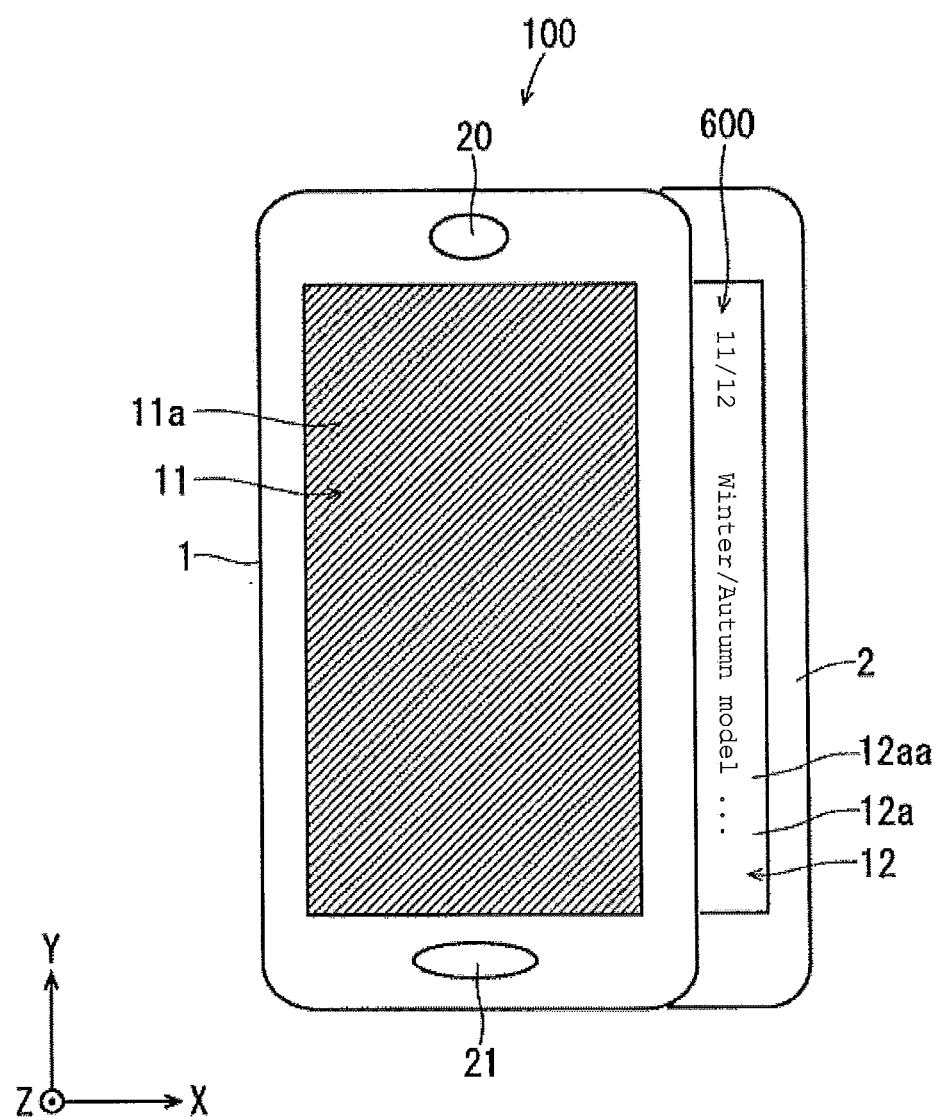
FIG. 38 is an illustration of an exemplary external view of a mobile device according to an embodiment of the disclosure.

Then, as shown in FIG. 38, if the attitude detection part 32 detects the attitude of the mobile phone 100 wherein the voice output part 20 is positioned at the upper side and the voice input part 21 is positioned at the lower side on the upper side display surface 11a, the delivered news 600 is displayed on the exposed part 12aa.

Thus, the user can confirm various kinds of information by changing the attitude of the mobile phone 100, and changing the kind of information displayed on the exposed part 12aa, according to the attitude of the mobile phone 100 detected by the attitude detection part 32.

Third Modified Example

Figure 39:
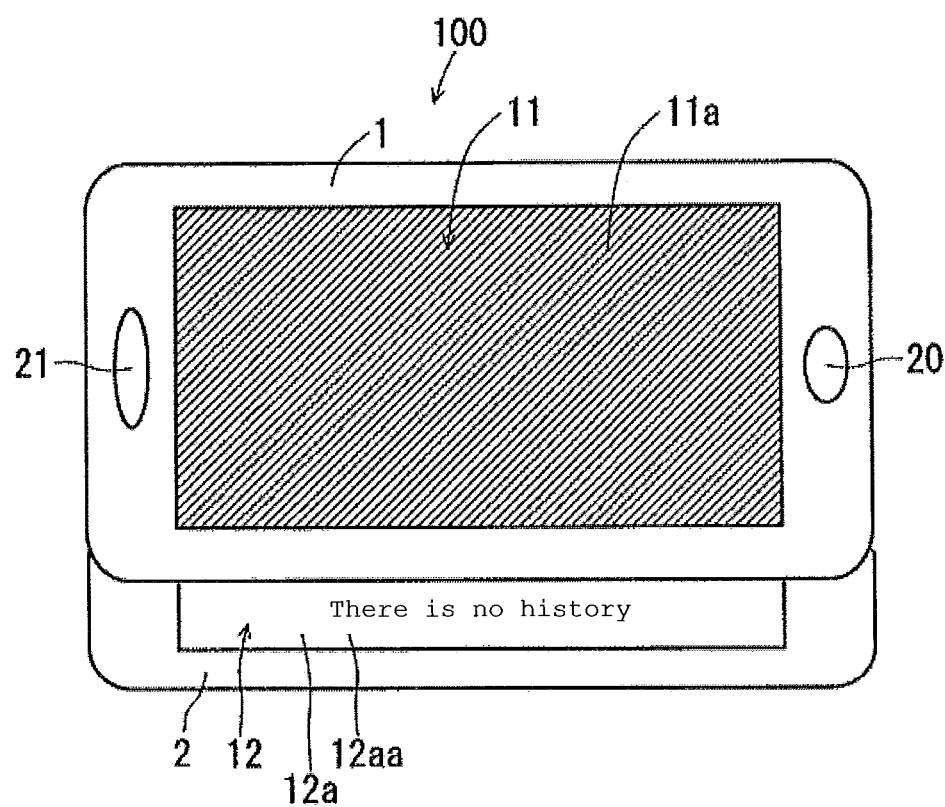
FIG. 39 is an illustration of an exemplary external view of a mobile device according to an embodiment of the disclosure.

In a case of immediately after purchase of the mobile phone 100, or in a case that all received call histories and received mail histories in the storage part 30b are deleted, information to be displayed on the exposed part 12aa does not exist, even when the mobile phone 100 is changed to the PO-first active mode. In this case, a message showing no information to be displayed, may be displayed on the exposed part 12aa. FIG. 39 is a view showing an example of a state that the exposed part 12aa displays the message showing no information to be displayed.

Figure 40:
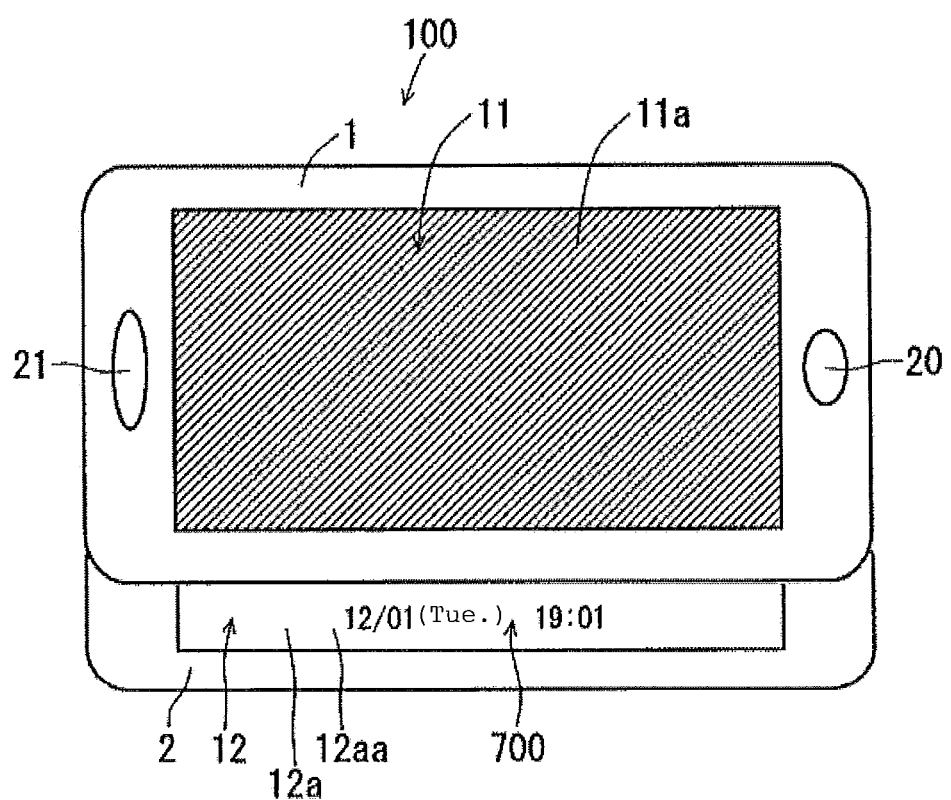
FIG. 40 is an illustration of an exemplary external view of a mobile device according to an embodiment of the disclosure.

Further, if there is no information to be displayed on the exposed part 12aa, as shown in FIG. 40, the present time (including date) 702 may be displayed on the exposed part 12aa.

Figure 41:
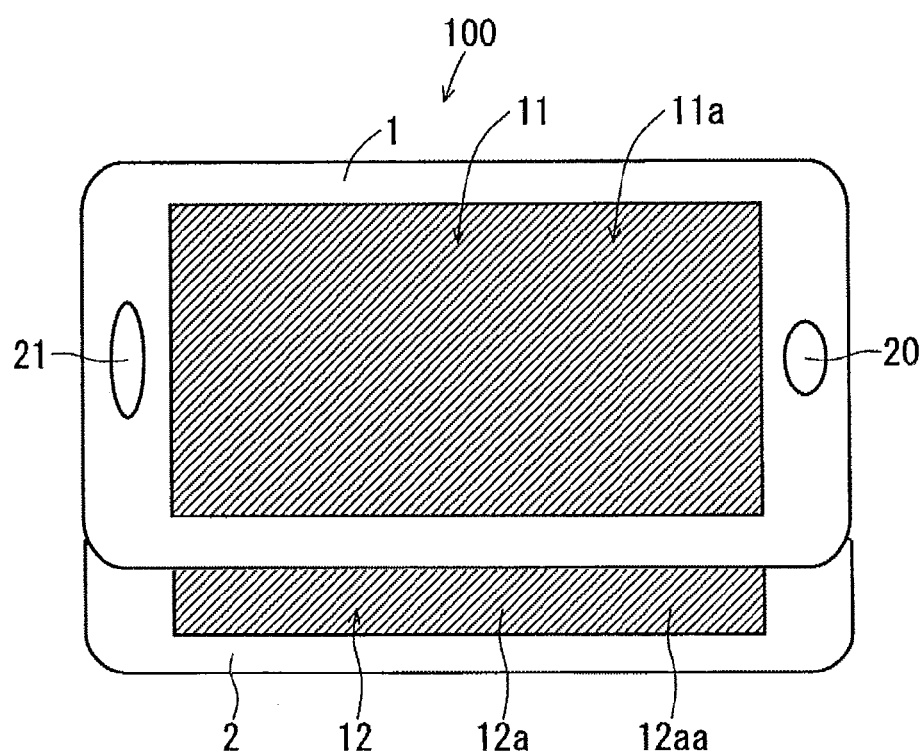
FIG. 41 is an illustration of an exemplary external view of a mobile device according to an embodiment of the disclosure.

Further, if there is no information to be displayed on the exposed part 12aa, as shown in FIG. 41, the display of the exposed part 12aa may be set in the off state. Thus, the power consumption can be further reduced. In this case, it is desirable to set the entire area of the lower side display surface 12a in the off state, from a viewpoint of reducing the power consumption. However, only the exposed part 12aa may be set in the off state. A state of the display set in the off state is shown by diagonal lines of FIG. 41.

Fourth Modified Example

Figure 42:
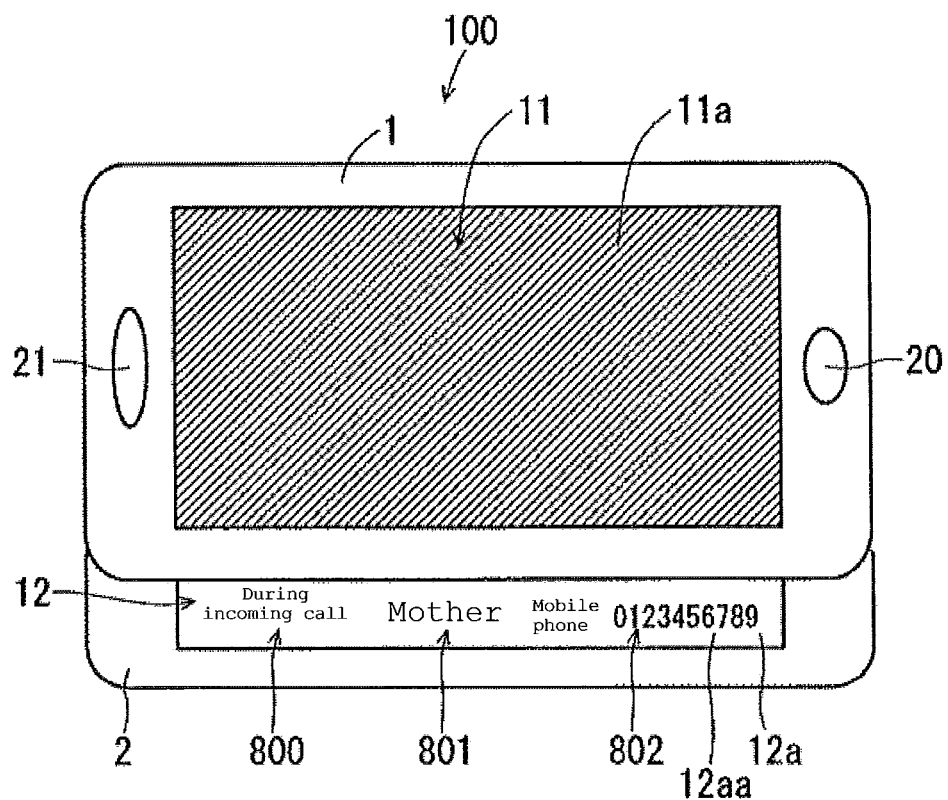
FIG. 42 is an illustration of an exemplary external view of a mobile device according to an embodiment of the disclosure.

If the communication control part 132 detects the incoming call of a speech by the radio communication part 31 when the mobile phone 100 is operated in the PO-first active mode, as shown in FIG. 42, the display control part 130 may display the incoming call in the exposed part 12aa. At this time, the operation performed to the upper side display surface 11a is deemed to be ineffective. In an example of FIG. 42, information 800 showing a call being received, partner information 801 for specifying a communication partner, and telephone number 802 of the communication partner are displayed on the exposed part 12aa.

Then, if the user slides the upper side casing 1 of the mobile phone 100 during receiving call, so that the mobile phone 100 is changed from the partially open state to the close state, the communication control part 132 responds to the call by controlling the radio communication part 31. Thus, conversation with the communication partner is started in the mobile phone 100. Thus, the user can respond to the incoming call only by sliding the upper side casing 1.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way.

Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile phone, comprising:
a first casing comprising a first display module, the first display module comprising a first display surface;
a second casing comprising a first surface mutually opposed to a second surface and slidable on the first display surface with the first surface at a side of the first casing, and comprising a second display module comprising a second display surface, the second display surface comprising a touch panel function and being exposed from the second surface;
a display control module operable to control the first display module and the second display module;
wherein the first casing and the second casing are settable in a first positional relation in which an entire area of the first display surface is covered with the second casing, a second positional relation in which an entire area of each of the first display surface and the second display surface is visible, and a third positional relation in which a part of the first display surface is visible, a part of the first display surface is covered with the second casing, and an entire area of the second display surface is visible, by sliding the second casing on the first display surface, and
wherein the display control module is configured to, while the first casing and the second casing are in the third positional relation,
cause the second display module to turn off a backlight for the visible second display surface,
cause the first display module to display information on the visible part of the first display surface, and
switch the information displayed on the visible part of the first display surface, if a prescribed operation is performed to the visible second display surface while the backlight for the second display surface is turned off.

2. The mobile phone according to claim 1, wherein when the prescribed operation is performed to the second display surface, the information displayed on the visible part of the first display surface is switched by scrolling the display of the visible part of the first display surface.

3. The mobile phone according to claim 1, wherein, when the positional relation between the first casing and the second casing is the third positional relation, a display of the covered part of the first display surface is set in an off state under control of the display control module.

4. The mobile phone according to claim 1, wherein a setting screen for selecting the information displayed on the visible part of the first display surface is displayed on at least one of the first display surface and the second display surface.

5. The mobile phone according to claim 1, wherein a setting screen for setting whether or not the information displayed on the visible part of the first display surface should be limited is displayed on at least one of the first display surface and the second display surface.

6. The mobile phone according to claim 1, wherein a setting screen operable to set a luminance of the visible part of the first display surface is displayed on at least one of the first display surface and the second display surface.

7. The mobile phone according to claim 1, wherein at least one of a received call history, a received electronic mail history, and distributed news from a web server is displayed on the visible part of the first display surface.

8. The mobile phone according to claim 7, wherein the received call history is displayed on the visible part of the first display surface, the mobile phone further comprising:
a radio communication module operable to perform a radio communication; and
a communication control module operable to control the radio communication module,
wherein, when a selection is performed of a received call from the received call history displayed on the visible part of the first display surface and thereafter the positional relation between the first casing and the second casing is changed to the first positional relation from the third positional relation, the communication control module controls the radio communication module to make a call to a telephone number associated with the selected received call.

9. The mobile phone according to claim 8, wherein when the positional relation between the first casing and the second casing is set in the third positional relation and thereafter the positional relation between the first casing and the second casing is changed to the first positional relation from the third positional relation without performing the selection to the second display surface, the display of the entire area of the second display surface is lightened off while the display of the entire area of the first display surface remains to be lightened off.

10. The mobile phone according to claim 7, wherein the received call history is displayed on the visible part of the first display surface, and, when the positional relation between the first casing and the second casing is changed to the second positional relation from the third positional relation, the received call history is listed on at least one of the first and second display surfaces.

11. The mobile phone according to claim 7, wherein the received electronic mail history is displayed on the visible part of the first display surface, and, when a selection of a received electronic mail from the received electronic mail history displayed on the visible part of the first display surface is performed and thereafter the positional relation between the first casing and the second casing is changed to the first positional relation from the third positional relation, a browsing screen of the selected received electronic mail is displayed on the second display surface.

12. The mobile phone according to claim 11, wherein, when the positional relation between the first casing and the second casing is set in the third positional relation and thereafter the positional relation between the first casing and the second casing is changed to the second positional relation from the third positional relation without performing the selection, the received electronic mail history is listed on at least one of the first and second display surfaces.

13. The mobile phone according to claim 7, further including:
- an operation content specifying module operable to specify a content of an operation performed to the second display surface; and
- a positional relation specifying module operable to specify a positional relation between the first casing and the second casing,
- wherein the received electronic mail history is displayed on the visible part of the first display surface, and, when it is specified by the operation content specifying module that a selection of a received electronic mail from the received electronic mail history displayed on the visible part of the first display surface is performed and thereafter it is specified by the positional relation specifying module that the positional relation between the first casing and the second casing is changed to the second positional relation from the third positional relation, an edit screen of an electronic reply mail to the selected received electronic mail is displayed on at least one of the first and second display surfaces.

14. The mobile phone according to claim 13, wherein, when the selection of the received electronic mail is performed and thereafter the positional relation between the first casing and the second casing is changed to the second positional relation from the third positional relation, an edit screen of an electronic reply mail to the selected received electronic mail is displayed on one of the first display surface and the second display surface and a browsing screen of the selected received electronic mail is displayed on one of the first display surface and the second display surface that is not displaying the edit screen.

15. The mobile phone according to claim 1, further comprising an attitude detection module operable to detect an attitude of the mobile phone, wherein the display control module changes a kind of information displayed on the visible part of the first display surface according to the attitude detected by the attitude detection module.

16. The mobile phone according to claim 1, wherein, when information does not exist to be displayed on the visible part of the first display surface, the display control module displays an indication that no information to be displayed exists on the visible part of the first display surface.

17. The mobile phone according to claim 1, wherein, when information does not exist to be displayed on the visible part of the first display surface, at least the display of the visible part of the first display surface is lightened off by the display control module.

18. The mobile phone according to claim 1, comprising:
- a radio communication module operable to perform radio communication; and
- a communication control module operable to control the radio communication module,
- wherein, when the positional relation between the first casing and the second casing is set in the third positional relation and an incoming call is detected by the radio communication module, the display control module causes display of the incoming call on the visible part of the first display surface.

19. The mobile phone according to claim 18, wherein, when the positional relation between the first casing and the second casing is changed to the first positional relation from the third positional relation during an incoming call, the communication control module controls the radio communication module to respond to the call.

* * * * *